US012748804B2

(12) United States Patent
Couto

(10) Patent No.: US 12,748,804 B2
(45) Date of Patent: Sep. 29, 2026

(54) SYSTEMS AND METHODS FOR MODULAR DATA STREAMS USING GRANULAR VERSION CONTROL AND CONTEXT ASSOCIATIONS

(71) Applicant: SoCreate Inc., San Luis Obispo, CA (US)

(72) Inventor: Justin Couto, San Luis Obispo, CA (US)

(73) Assignee: SoCreate Inc., San Luis Obispo, CA (US)

(*) Notice: Subject to any disclaimer, the term of this patent is extended or adjusted under 35 U.S.C. 154(b) by 0 days.

(21) Appl. No.: 19/275,191

(22) Filed: Jul. 21, 2025

(65) Prior Publication Data

US 2026/0030290 A1 Jan. 29, 2026

Related U.S. Application Data

(60) Provisional application No. 63/675,059, filed on Jul. 24, 2024.

(51) Int. Cl.
*G06F 16/538* (2019.01)

(52) U.S. Cl.
CPC .................................. *G06F 16/538* (2019.01)

(58) Field of Classification Search
CPC .................................................... G06F 16/538
See application file for complete search history.

(56) References Cited

U.S. PATENT DOCUMENTS

| | | | | |
|---|---|---|---|---|
| 11,809,688 | B1 | 11/2023 | Parasnis et al. | |
| 11,978,271 | B1 | 5/2024 | Kharbanda et al. | |
| 12,008,332 | B1 | 6/2024 | Gardner et al. | |
| 12,039,431 | B1 | 7/2024 | Deutsch et al. | |
| 12,504,992 | B2 * | 12/2025 | Niu | G06F 9/5027 |
| 2024/0095534 | A1 | 3/2024 | Anandkumar et al. | |
| 2024/0193913 | A1 | 6/2024 | Saraee et al. | |
| 2024/0348896 | A1 * | 10/2024 | Agrawal | H04N 21/42203 |
| 2025/0252271 | A1 * | 8/2025 | Weisz | G06F 40/40 |
| 2025/0336122 | A1 * | 10/2025 | Gong | G06T 11/60 |

* cited by examiner

*Primary Examiner* — Tony Wu
(74) *Attorney, Agent, or Firm* — Carr & Ferrell LLP; Sean M. Cody

(57) ABSTRACT

Embodiments of the present disclosure include systems and methods for compilation of a data stream using granular version control and context associations, the system comprising: a processor and memory coupled to the processor, both coupled to one or more large language models, the memory having instructions that perform the steps of a method comprising: receiving user-defined global modules with global module data containers; receiving user-defined local modules with local module data containers; associating object data from the user-defined global modules with the user-defined local modules; and publishing the data stream. The publishing comprises: submitting the associated data to the large language models, the large language models generating prompts; submitting the prompts to the large language models to generate images; associating the images with object data contained in the local data containers; collating the images to form the linear data stream; and outputting the linear data stream in re-playable format.

20 Claims, 21 Drawing Sheets

FIG. 4B
115j
115k
115m
*James Arnet*, *20ish*, *cocky and smooth*, kicks the blankets off and sits up in bed. He rubs his eyes and swings out.

FIG. 4C
115j
115k
115m
*He takes his SIX-SHOOTER from the night-stand*, opens the chamber, spins it, then closes it. He puts the gun in a belted

SYSTEMS AND METHODS FOR MODULAR DATA STREAMS USING GRANULAR VERSION CONTROL AND CONTEXT ASSOCIATIONS

CROSS-REFERENCE TO RELATED APPLICATIONS

The present application claims the priority benefit of U.S. Provisional Patent Application Ser. No. 63/675,059, filed on Jul. 24, 2024, titled "Systems and Methods for Modular Data Streams Using Granular Version Control and Context Associations", which is hereby incorporated by reference in their entirety, including all appendices.

FIELD OF THE TECHNOLOGY

Embodiments of the disclosure relate to data streams and methods of assembly and arrangement of the same, including, but not limited to those comprised of modular components with granular version control and contextual associations.

SUMMARY OF EXEMPLARY EMBODIMENTS

Embodiments of the disclosure include a system for compilation of a data stream using granular version control and context associations, the system comprising: a processor and a memory coupled to the processor, the processor and the memory coupled to one or more large language models, the memory having instructions which, when executed, perform the steps of exemplary methods. An exemplary method comprises receiving one or more user-defined global modules and one or more global module data containers within the one or more global modules; receiving one or more user-defined local modules and one or more local module data containers within the one or more local modules; associating object data from the one or more user-defined global modules with the one or more user-defined local modules; and publishing the data stream. The publishing, according to the exemplary method, comprises: submitting the associated data to the one or more large language models, the one or more large language models generating a plurality of prompts for subsequent image generation; submitting the plurality of prompts to the one or more large language models to generate a plurality of images; associating the plurality of images with object data contained in the one or more local data containers; collating the plurality of images to form the linear data stream; and outputting the linear data stream in re-playable format.

In some embodiments, at least one of the one or more local modules functions as a structural element for the data stream and at least one of the one or more local data containers functions as a contextual data container providing contextual data for the linear data stream. In some embodiments, at least one of the one or more global module data containers or at least one of the one or more local data containers comprises an object container for an object in the data stream.

The linear data stream may comprise any data stream that is viewed in a linear format, such as re-playable format. However, examples include a screenplay, an academic paper, a recipe, a travel guide, and a product demonstration.

In some embodiments, the publishing further comprises training an object model on object data and data from at least one source database, the object model representing an object associated with the data stream. Examples of object models include models for a character in a screenplay; a reference in an academic paper; an ingredient in a recipe; an overview of a product; and a location associated with the linear data stream.

Embodiments for methods of making, using, and assembling the exemplary systems are further disclosed herein.

BRIEF DESCRIPTION OF THE DRAWINGS

While this technology is susceptible of embodiment in many different forms, there is illustrated in the drawings, and will herein be described in detail, several specific embodiments with the understanding that the present disclosure is to be considered as an exemplification of the principles of the technology and is not intended to limit the technology to the embodiments illustrated.

It will be understood that like or analogous elements and/or components, referred to herein, may be identified throughout the drawings with like reference characters. It is further understood that several of the figures are merely schematic representations of the present technology. As such, some of the components may be distorted from their actual scale for pictorial clarity.

DETAILED DESCRIPTION OF EXEMPLARY EMBODIMENTS

Figure 1:
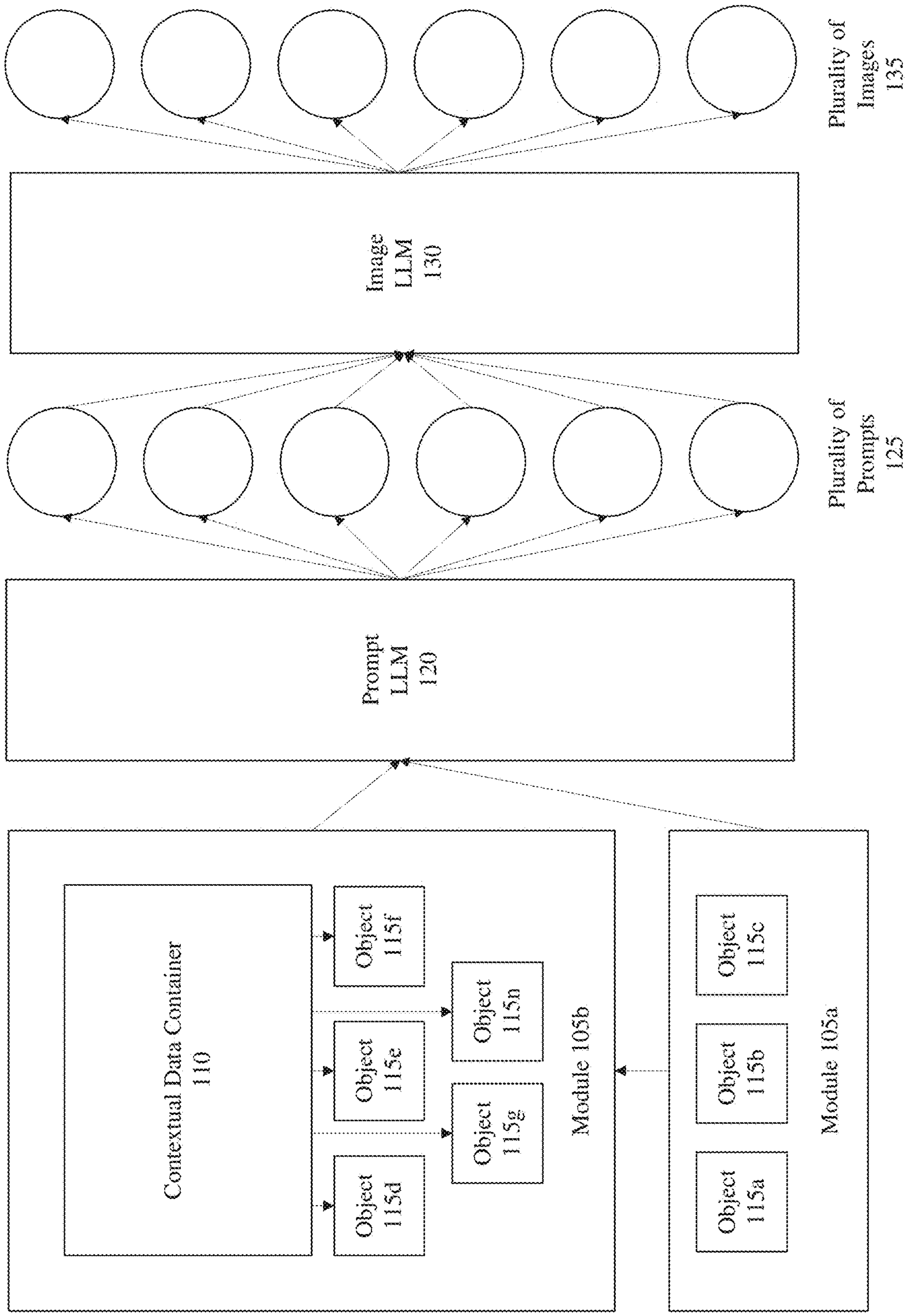
FIG. 1 diagrammatically depicts an exemplary system for generating and publishing a data stream using granular version control and context associations.

Embodiments of the present disclosure utilize artificial intelligence technologies, including Large Language Models, or LLMs.

As used herein, the term language model generally refers to a probability distribution over sequences of words. Language models generate probabilities by training on large and structured sets of text, or text corpora. A single text corpus may include a single language or many languages, and may have various levels of structure based on, for example, grammar, syntax, morphology, semantics, and pragmatics.

A Large Language Model, or LLM, refers to a language model consisting of a deep learning architecture that is trained on large quantities, often tens of gigabytes, of unlabeled text using self-supervised learning or semi-supervised learning to produce generalizable and adaptable output. The deep learning architecture may be comprised of a neural network with billions of weights or parameters. In some embodiments, the neural network may be a transformer, which uses parallel multi-head attention mechanism, or alternatively the neural network may be recursive, operating in sequence.

Additionally, in some embodiments, the Large Language Model is communicatively coupled with one or more source databases.

LLMs can be used in conjunction with other models to generate images from text prompts. Such models may use text-to-image generation, image captioning, image understanding for identification of visual information, and multimodal reasoning to guide image generation.

Some LLMs are further configured to process or generate speech from audio or text input. These voice LLMs allow for natural voice playback and interaction.

In various embodiments of the present disclosure, content for publication is organized as a stream made of modular components. In some embodiments, the components include structural elements that can be defined by the creator.

For example, in screenwriting, structural components include scenes and acts, which wrap modules of a data stream. Within a scene, further structural components include descriptive elements, action elements, and dialogue, among other examples.

Each module can have an unlimited number of structural elements associated with the module. In screenwriting, creators may define elements of dialogue without limitations or pre-sets. Creators may define elements such as setting, imagery, direction of speech and appearance, and whether characters are speaking on or off camera.

The system uses hierarchical structure having modular content. A module may refer to an act or portion of the screenplay having one or more scenes, to an episode or installment of a series, or to a scene itself. The function of the module is determined by the user. Each module includes at least one data container in which a user enters data as input. The data container may define an object, such as an object container, or context for the data stream, such as a contextual data container. One or more objects are associated with the module, and thus with the other data containers within the module. Modules or containers may also be used to represent chapters, sections, or other segments of linear stream projects.

In some embodiments, global modules can be created for objects and data elements that are referenced throughout a project. For a screenplay, global modules can be used to define a character and the traits associated with that character, to define a scene setting and its attributes, or to define a prop and its descriptive qualities. Local modules are also created for contextual data elements, such as actions in a scene or dialogue. Objects and data elements can also be created in local modules, such as for a character or prop with an appearance in a single scene.

Associated with each module is at least one object, or content element. In screenwriting projects, these objects may include characters, character traits, props, scenery, action cues, and transition cues. In academic papers, objects may include authors and common terms related to the subject of the paper. In recipes, objects may include individual ingredients or steps in the preparation method.

Further categories of data stream are enabled by this disclosure, including travel guides, product presentations, architectural models, and simple slideshows such as family vacation albums. Travel guides may include objects, or content elements, such as sights or pin-drop locations. Product presentations may include objects such as product details and interactive elements, such as "buy now" buttons. Architectural models may include features within the building, such as size and dimensions; electric, water, and cable lines; or fixtures and materials.

Embodiments of the technology enable users to generate entire works with playback in linear format. In one example, a user develops a movie by entering data for one or more modules for acts, scenes, or other segments of the movie. The data may comprise dialogue, action cues, auditory cues, or scene transitions, by way of example. The user also enters object data associated with characters, props, scenery, and other objects that are depicted in the movie, either visually or auditorily.

Linear content refers to content that is viewed or consumed in a linear order. Examples include a single audio feed, video feed, or document such as an article or paper. It should be noted that exemplary embodiments include multiple linear content feeds, as well as embodiments that branch from one feed into multiple. As such, while exemplary embodiments herein generally refer to single linear feeds, embodiments are enabled for multiple parallel and non-parallel linear feeds. In various embodiments, images can be created based on content and structural elements of the modules. The images can be generated from the modules individually or, in some embodiments, in context with other or all modules in the data stream.

According to one method, all data in the project is structured according to the modular order of the raw file, then submitted to one or more large language models as part of an initial set of prompts. These prompts are finely tuned for consistency and ordered to include all data in the raw file, according to its modular structure. In some embodiments, the initial set of prompts submits a request to a large language model to generate a series of images to associate with the contextual data in the data stream. In some cases, the large language model generates audio to be associated with the contextual data, such as dialogue, soundtrack, and sound effects. In further embodiments, a first large language model generates the initial set of prompts and submits the initial set of prompts to a second large language model to generate images and any audio. This use of separate models fosters consistency across images and allows users to edit prompts directly for precision changes.

In some embodiments, an object model is generated for each object within the project. As used herein, an object model generally comprises a data model supporting an object within the project, including user-submitted data and data generated by machine-learning methods, such as by an LLM.

An object model may, for example, be trained for each character, location, or prop in a screenplay. In an architectural model, an object model may be trained for each feature. The system maintains consistency across the plurality of image frames by referencing each unique object model to generate prompts and images.

The system draws from the user-submitted data to create a plurality of prompts. When a user desires to see the project in linear playback format, the user selects an option, shown below as "Publish." The prompts are submitted to a large language model with the user-submitted data to generate a plurality of image frames associated with the content in the user-submitted data. In some embodiments, audio content is generated for the plurality of image frames, such as voiceover content, sound effects, and musical accompaniment.

The system then compiles the images and any accompaniment into a playback stream. In general, content from the entire project file is used to complete the prompts and generate the images. This uniformity of data use helps to ensure that images and sound elements are consistent across the data stream.

The user then publishes and reviews the linear stream. After publication, the user may access the modules to edit content within the stream. For example, the user may determine that a costume choice as generated by the system is inappropriate for the final product. The user then edits the costume content element in the character module. In some embodiments, the user is also able to edit any of the plurality of prompts directly.

In some embodiments, the system submits a first plurality of prompts to an LLM, which in turn generates a second set of prompts that are submitted to an LLM to generate the plurality of images. In such embodiments, the first set of prompts may be used to complete missing segments in the data stream, such as incomplete story segments. The use of a first and second set of prompts helps to ensure robust detail for image generation. In such embodiments, when the second set of prompts is generated, the second set of prompts is compiled into a linear list. Each of the second set of prompts is then used to generate an image, which is then scaled and saved into the structure of the stream. The images then become part of the project file.

If the user desires to republish the project with edits, the user may delete one or more images and/or may edit the desired details within the containers. In some embodiments, the user may edit one or more of the first or second set of prompts directly. The user may then select “Republish” to republish the data stream.

During the republication process, the system determines which elements within the data stream have been altered and should be republished. For example, if only a character’s voice quality has changed, only the scenes in which that character speaks will be republished. Alternatively, the user may request an entirely new publication by selecting “Publish” to generate a new version of the entire data stream.

In some embodiments, the system supports assistive technologies such as a text-to-speech (TTS) function, in which the data stream is automatically read aloud.

In some embodiments, third-party users interact with data streams by leaving comments and offering ratings, such as star ratings, numeric ratings, or similar methods. In some embodiments, third-party users interact with data streams by receiving a share link and editing elements or modules directly.

FIG. 1 diagrammatically depicts an exemplary system for generating and publishing a data stream using granular version control and context associations. The system uses at least one module 105*a-b*, which may have one or more contextual data containers 110. In the example shown, module 105*b* includes one or more contextual data containers 110 (one is depicted) as well as object containers 115*d-n*. Module 105*a* includes object containers 115*a-c* that can be associated with module 105*b*, including with the one or more contextual data containers 110. In some embodiments, each module includes a structural element indicating its function within the project, such as an act, scene, introduction, abstract, chapter, or section of a work to be published.

Applying the example of FIG. 1 to a screenplay embodiment, module 105*a* may represent common or global objects that are used throughout the work, such as characters and locations, depending on the user-defined purpose of module 105*a*. Global attributes can also be assigned, such as a character’s facial features, vocal tone, age and aging characteristics, biographical data, and ways in which the characters visually relate to the world around them. Accordingly, object containers 115*a-c* may contain such information regarding characters or locations. Module 105*b* may represent an act having one or more scenes, the one or more scenes described by the data contained in the one or more contextual data containers 110.

Some object containers 115*a-n* may include character variations, such as aliases, audible, and visual characteristics that deviate from an initial embodiment of the character. The user may associate such containers with specific modules or stream data containers associated with the variations, such as disguises, alter egos, or evolution of a character throughout a story. The object containers 115*a-n* may also include location variations or variations on commonly shown visual cues, such as props, scenery, and transitions, as defined by the user.

When a draft of a data stream project is completed, a user selects an option to publish. The system submits information in the data modules, including data within the object containers 115*a-n* and the one or more contextual data containers 110, to a prompt-generating large language model 120. The submission is received as an initial plurality of prompts (not shown) that are fine-tuned to instruct the prompt-generating large language model 120 to generate a second plurality of prompts 125. The second set of prompts directs an image large language model 130 to generate a plurality of images 135, which are then collated and published as a data stream in re-playable format.

The association of object data from both global and local modules to contextual data helps to ensure consistency across the data stream. For example, a character in a screenplay is referenced consistently by global attributes. The character will thus maintain consistencies in appearance and disposition throughout the screenplay, except when varied by local object data indicating a variation, such as wet hair in a rainstorm, a change in costume or uniform, or character development for a change in disposition.

In some embodiments, users directly edit the initial plurality of prompts and the second plurality of prompts 125, in addition to any direct editing of data in the one or more data modules 105*a-b*. In some embodiments, the initial set of prompts is submitted directly to the image large language model 130, bypassing the prompt-generating large language model 120.

Applying the example of FIG. 1 to an academic paper, module 105*a* may represent author profiles or references, as defined by the user. Module 105*b* may represent the contents of the paper as defined by the one or more contextual data containers 110, which may be divided into abstract, introduction, body, and conclusion, or may be included in one single container, as determined by the user.

Figure 2:
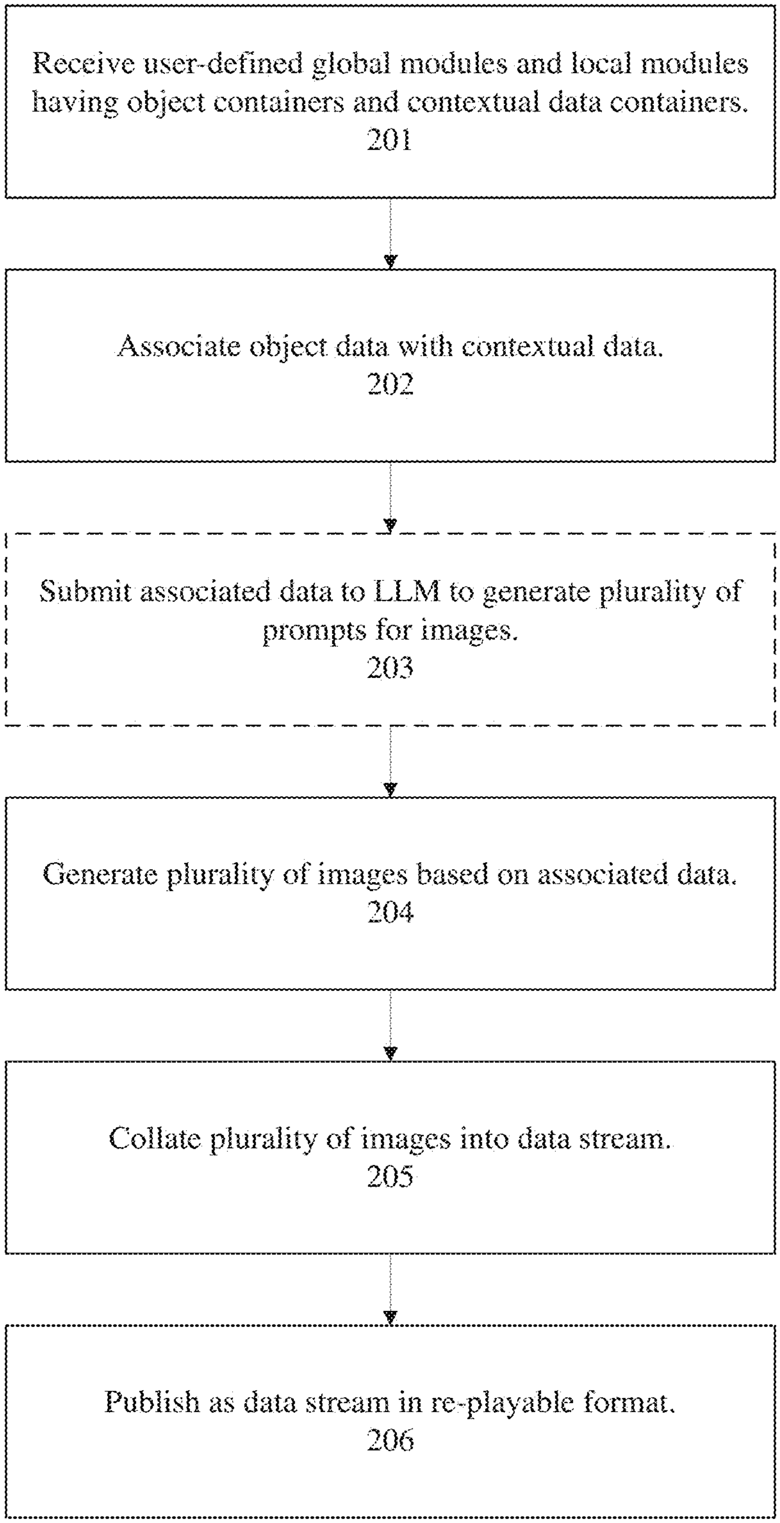
FIG. 2 diagrammatically illustrates an exemplary method for generating and publishing a data stream using granular version control and context associations.

FIG. 2 diagrammatically illustrates an exemplary method for generating and publishing a data stream using granular version control and context associations. At step 201, the system receives user-defined global modules and local modules having object containers and contextual data containers. At step 202, object data within the object containers is associated with contextual data in the contextual data containers.

In some embodiments, the associated data is submitted to a prompt-generating large language model to generate a plurality of prompts for image generation at step 203. Alternatively, a plurality of prompts for image generation is submitted directly to an image-generating large language model at step 204.

The images are collated to form a single linear data stream at step 205. The collation may include ordering the images according to the order of one or more modules 105*a-b* or the one or more contextual data containers 110 nested within the one or more modules 105*a-b*. In some embodiments, audio playback is generated and associated with the plurality of images, such as dialogue, music, background noise, or scripted sounds.

When the collation of images is completed, the data stream is published in a re-playable format at step 206. The user may review the publication for errors, consistency, and quality, and may then edit the data containers to make changes. In some embodiments, the user edits the plurality of prompts directly.

Figure 3A:
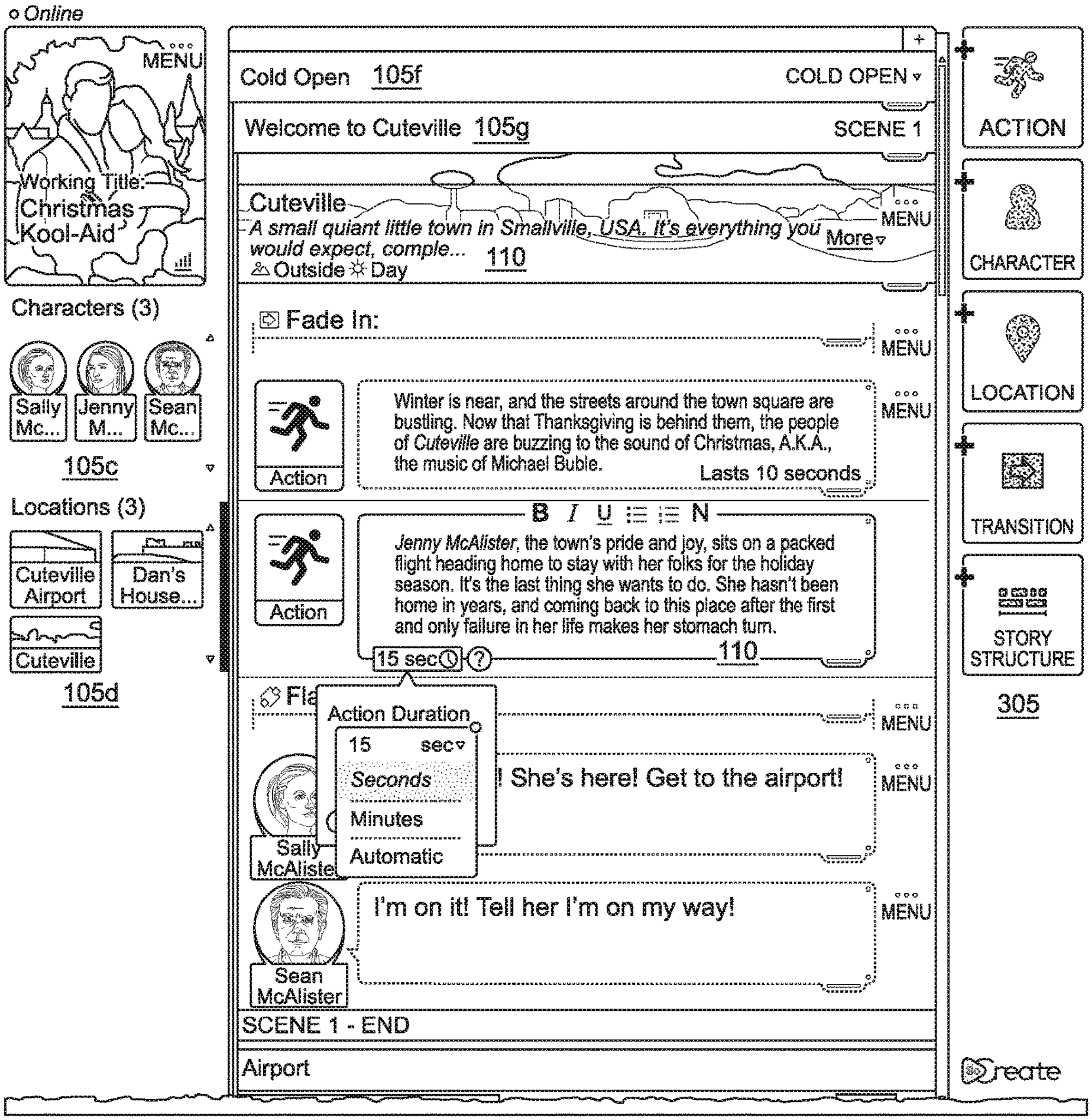
FIGS. 3A-3D depict an exemplary embodiment of a data stream for a screenplay having modular assembly with granular version control and context associations.

FIG. 3A depicts an exemplary use case of the present disclosure for a screenplay. Two global modules have been defined by the user: a global character module 105*c* and a global location module 105*d*. A first user-defined local module 105*f*, has also been generated, as has a second user-defined local module 105*g*, which is nested within the first user-defined local module 105*f*. The first user-defined local module 105*f* represents a "cold open" structural element in the screenplay, and the second user-defined local module 105*g* represents a scene within the cold open.

The user can open new global modules 105*a* or local modules 105*b*, new contextual data containers 110, and new object containers 115*n* using controls 305 depicted within the user interface. The controls 305 here indicate "Action", "Character", "Location", "Transition", and "Story Structure", which can be activated by a user command such as a click. The user can then add modules, contextual data containers 110, or object containers 115*n* as desired, either nested within other modules or as a new segment within the data stream.

In the element "Scene 1", content has been added to a contextual data container 110 describing a "small, quaint little town", and an image has been added. "Cold Open" and "Scene 1" can be selected by the user, and content can be entered. The content may include contextual data in a contextual data container 110, which is shown here as an action cue: "Jenny McAlister, the town's pride and joy, sits on a packed flight heading home . . . ." In the embodiment shown, this contextual data container 110 includes an Action Duration setting, in which a user may define the duration of the action before the data stream proceeds to the next contextual data container 110, which is depicted here as a dialogue container.

Figure 3B:
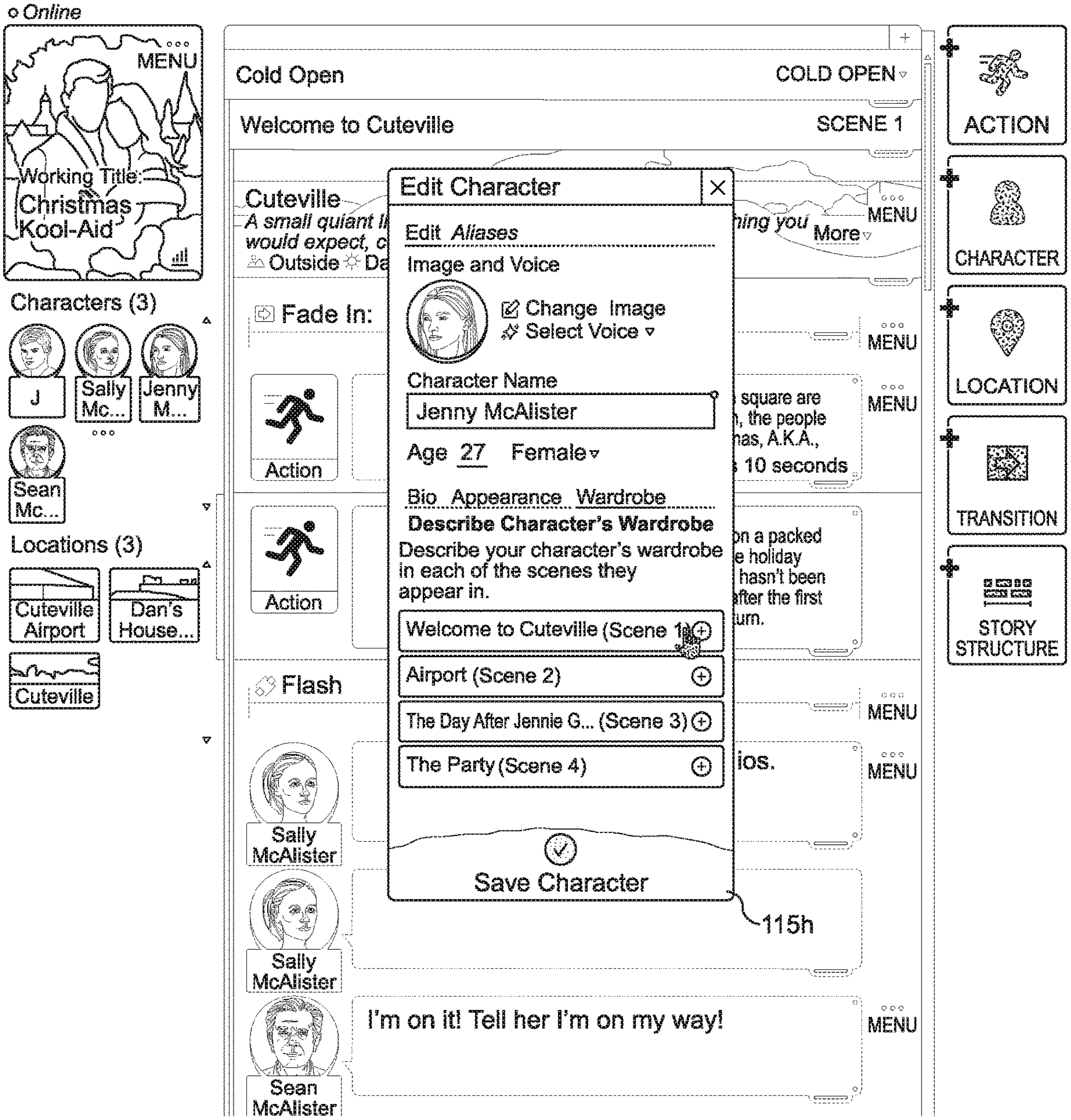

In the example shown in FIGS. 3A-B, global modules for characters and locations have been included. Associated context has been added to the character and location profiles.

FIG. 3B depicts a user selection of one object container 115*h* depicting one character that is referenced throughout the project. The object container 115*h* indicates the character's name, aliases, likeness, character type, wardrobe, and age. Traits in the object container 115*h* can be added or removed as the user desires. For example, other context information can be associated with the character, including further images and audio, such as sounds of the character's voice, accent, and inflection.

In the embodiment of FIG. 3B, the object container 115*h* includes some data that is specific to individual scenes, such as the character's wardrobe at an airport scene and at a party scene. The inclusion of associated data in a global module is one way the system maintains consistency for images generated across multiple contextual data containers 110 or multiple local modules 105*b*.

The creator can further enter one or more props into a module, either by defining a global prop module or by creating a prop object container associated with a contextual data container 110. The prop can have a name and description and can have associated context as defined in its object container or in the contextual data container.

In some embodiments, each module and each element within each module is version independent. In such embodiments, when data and associated context are changed in one element, module, or container, the data and associated context in other elements are not affected. However, users are enabled to make global changes, such as by updating a character profile in the Characters module or by updating a location in a scene without updating the location in individual elements of the scene.

In some embodiments, associated content for dialogue components includes options for Point of View Dialogue, Mouthing Dialogue (No Sound), Text Message, Sign Language, Foreign Language, and Continued Dialogue, non-exhaustively. These options are generally defined either as object containers 115*n* or, alternatively, as contextual data within a contextual data container 110. Other content can be associated with the component, including emotional cues (laughing or crying) or gestures.

In the example of FIGS. 3A-B, each local module is labeled an "Act", and each act includes at least one "Scene". Additional acts, scenes, sequences, episodes, and seasons can be introduced by a Story Structure editor. This exemplary embodiment further includes various options for camera transitions, such as "close on", "contrazoom", "crossfade", and "cut to", among others.

Figure 3C:
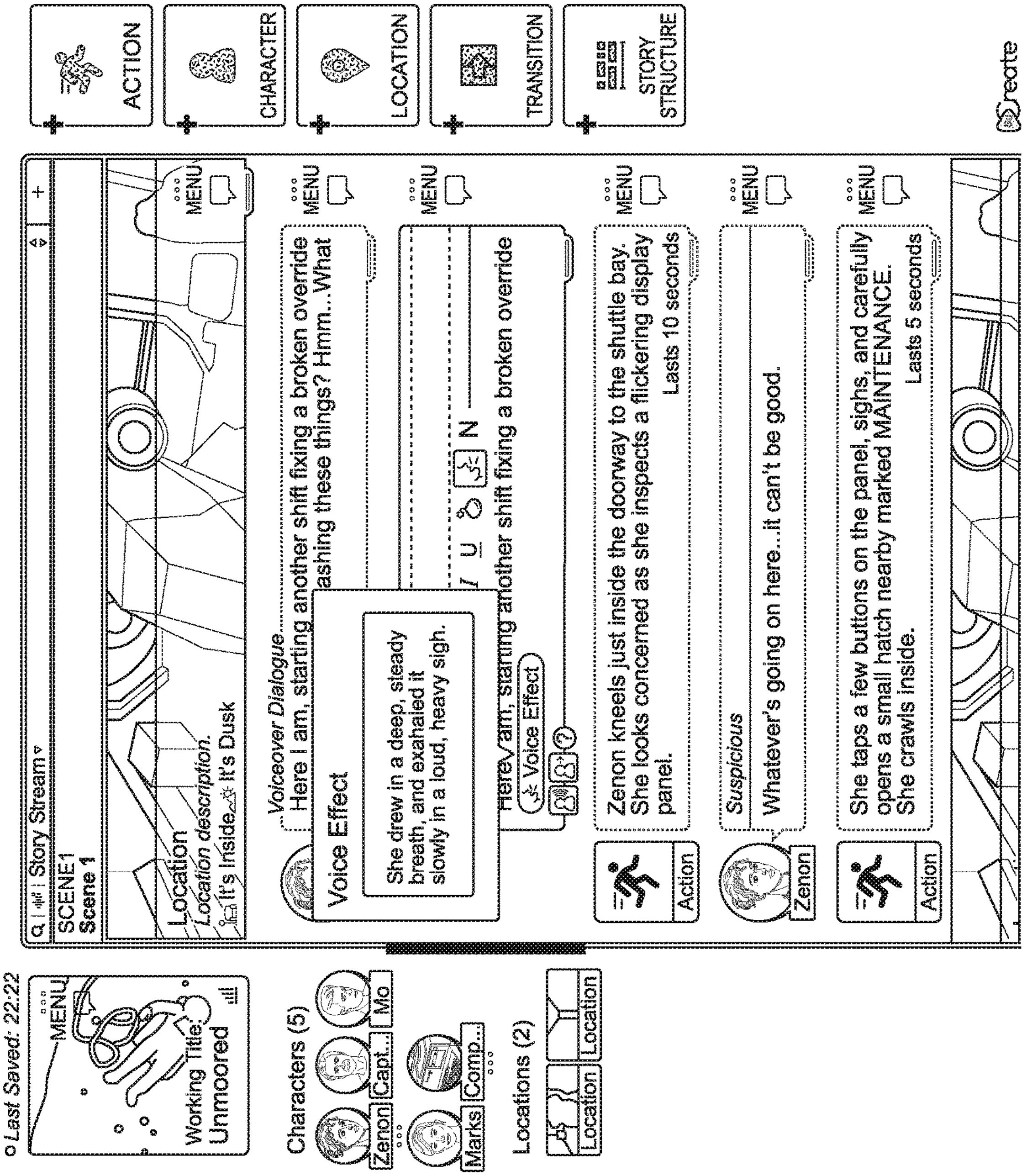
Figure 3D:
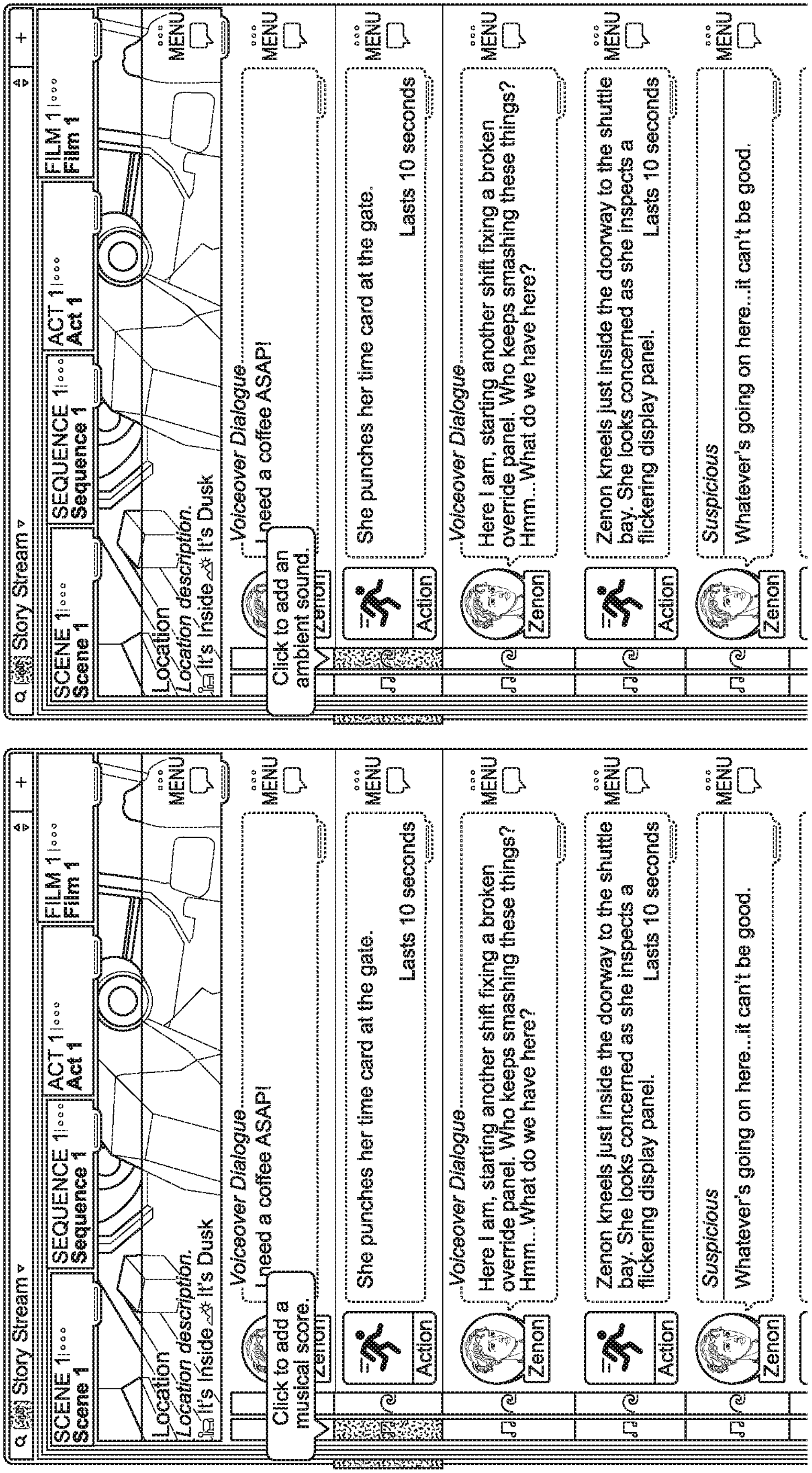

FIGS. 3C-3D depicts an exemplary use case of a screenplay incorporating audio elements into local and global modules. The example of FIG. 3C depicts a contextual data container 110 with an associated container that includes a description of audio that accompanies the action described in the contextual data. In some embodiments, an audio file is uploaded to the project and associated with the contextual data container 110. Alternatively, the audio is generated by submitting a textual description of the audio, such as that shown in FIG. 3C ("She drew in a deep, steady breath, and exhaled it slowly in a loud, heavy sigh"), along with the associated contextual data and object data, to one or more large language models. The large language models then associate the audio with the visual output to create a linear data stream.

The sound effects are not limited to characters, and in some examples describe activities in the background, such as punching a timecard. In some embodiments, the location of the sound can be varied by entering contextual data into a container indicating location variation.

In the example of FIG. 3D, two interfaces are presented. The first includes a score prompt 306, denoting that the user may "Click to add a musical score." The second includes an ambient sound prompt 307, denoting that the user may "Click to add ambient sound." In some embodiments, an audio file is uploaded to the project and associated with the module and its contextual data. In some embodiments, a description of the soundtrack or ambient sound is added in plain text, such as "A soft, lilting string section progressively fades in", or "a steady hum from the ship, accompanied by the soft buzzing of fluorescent lights". The descriptions, with the associated contextual data and object data, are submitted to one or more large language models. The large language models then associate the audio with the visual output to create a linear data stream.

Multiple score prompts 306 or ambient sound prompts 307 may be selected for continuous accompaniment across the contextual data containers 110 to which they are associated, or the prompts may be selected individually for isolated auditory effects.

Figure 4A:
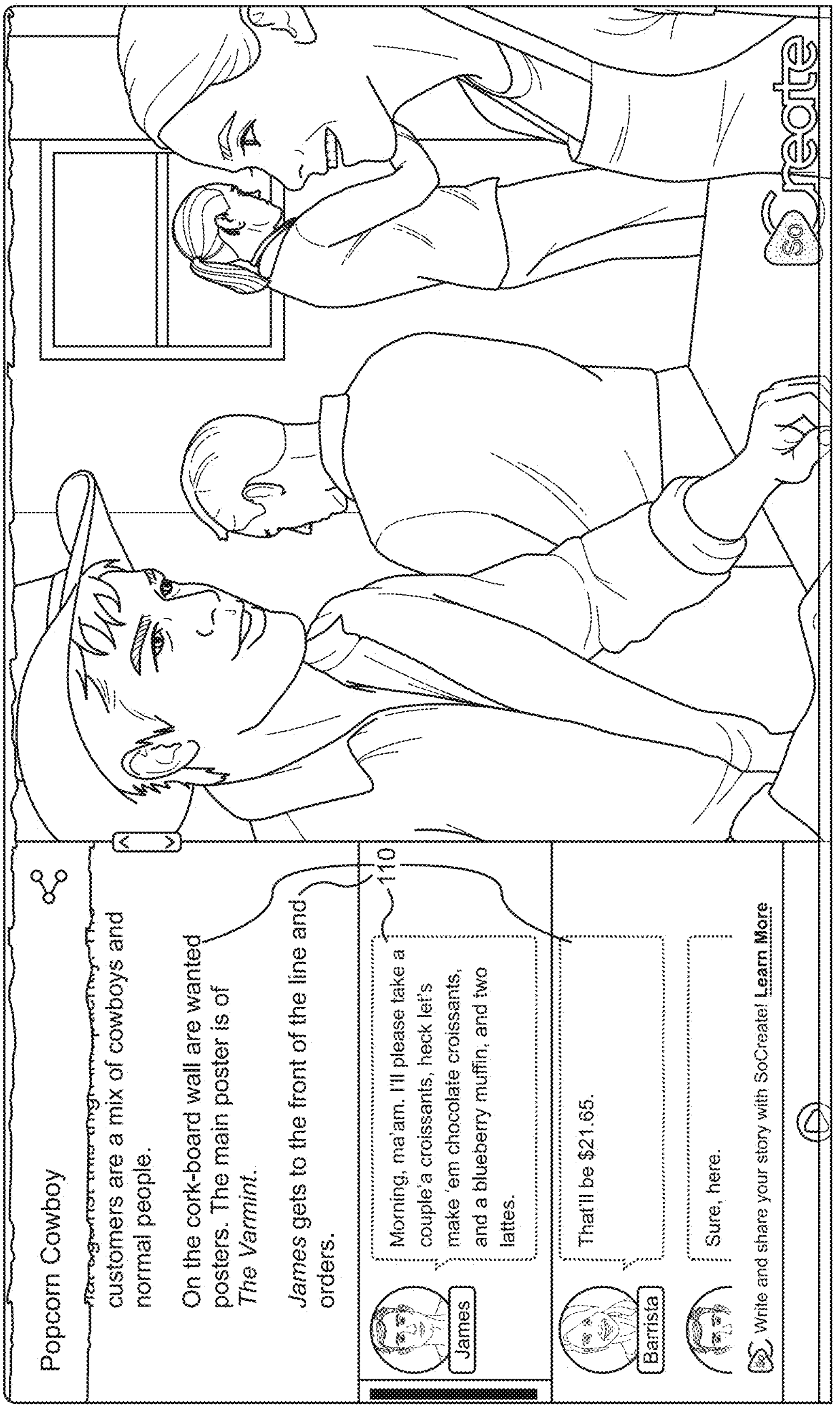
FIGS. 4A-4C depict a publication of a screenplay using the exemplary systems and methods described herein.
Figure 4B:
Figure 4C:

FIGS. 4A-4C depict a publication of a screenplay using the exemplary systems and methods described herein.

FIG. 4A depicts a display, viewable on a graphical user interface, of a screenplay and the images in the publication that are associated with the screenplay. The screenplay depicts two contextual data containers 110, first for action: "On the cork-board wall are wanted posters . . . "; and subsequently for dialogue: "Morning, ma'am . . . ". The characters, costumes, props, locations, and scenery are determined by associating data from object containers 115*n* to contextual data from contextual data containers 110.

FIGS. 4B-4C depict a scene in the screenplay with a character, a setting, and a prop, each of which is described by data in object containers 115*j*, 115*k*, and 115*m*. Object container 115*j* describes the character "James Arnet", and may include details such as his facial features, age, build, and disposition. In this embodiment, "20ish, cocky and smooth" are included in the contextual data container 110.

The attributes described in object container 115*j* help to ensure consistency across images depicting the character. In FIGS. 4B and 4C, the character's appearance and features are substantially similar, even as his action changes.

Object data in object container 115*k* describes scenery, such as the nightstand and table lamp. Object container 115*k* may be included in a global module 105*a* or as part of a local module 105*b*. Again, the nightstand and table lamp appear substantially similar as the image frame changes.

Object data in object container 115*m* describes a prop, in this case a six-shooter pistol. Object container 115*m* may be included in a global module 105*a* or as part of a local module 105*b*. The system identifies the six-shooter pistol object data and reads the data into a prompt to generate the images in both FIGS. 4B and 4C. The prompt is fine-tuned for consistency and reference to relevant data, including object container 115*m*, whether it is included in a global module 105*a* or local module 105*b*, such as the one describing the present scene. The six-shooter pistol maintains a consistent appearance as the image frame changes.

It should be noted that the system identifies that the six-shooter pistol is initially present on the nightstand, even if the pistol is not referenced until a subsequent contextual data container 110 or object container 115*n* in the data stream. The system thus identifies object data and relevant contextual data for image prompts regardless of where in the data stream the object data and contextual data are found.

Playback generally includes audio, such as soundtracks, ambient noise, and sound effects, which may be described in object containers directed to sound. In some embodiments, audio further includes character speech, such as monologue, narration, and spoken dialogue. For example, a scene depicting two characters, such as the scene in FIG. 4A, will generate natural language audio output in the form of dialogue between the two characters. The descriptions, with the associated contextual data and object data, are submitted to one or more large language models. The large language models then associate the audio to the visual output to create narration, monologue, or dialogue for the linear data stream.

The qualities of the voice, such as pitch, timbre, and speed, can be adjusted by editing voice qualities in an object container associated with the character's voice, whether local or global. Using the playback feature, a user listens to the dialogue as the dialogue might sound in a final product, such as a completed film, with the ability to edit the dialogue itself as well as the qualities associated with the dialogue.

Figure 5A:
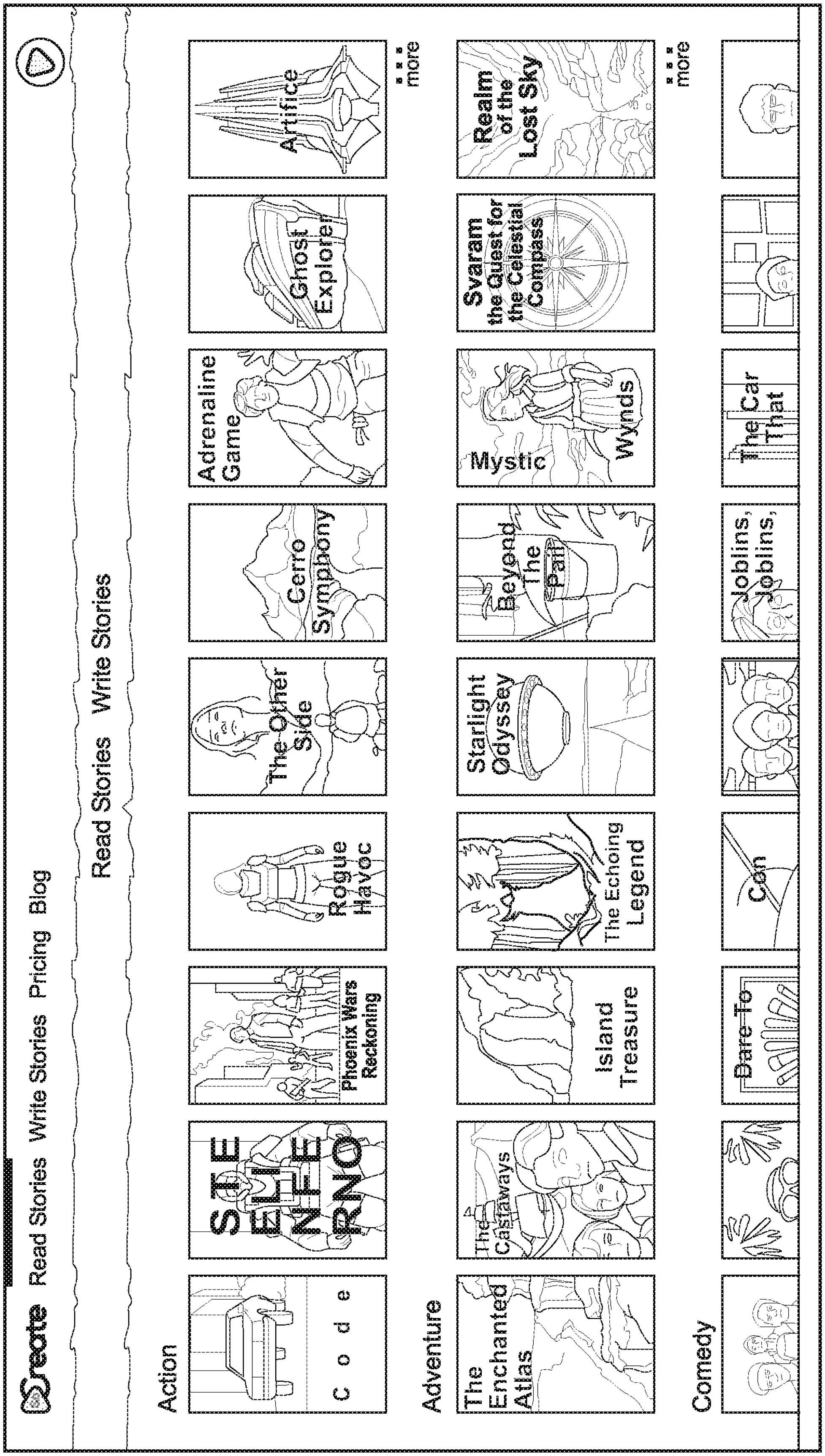
FIGS. 5A-5B depict an exemplary viewer platform for consumption of data streams that have been generated by the systems and methods disclosed herein.

FIG. 5A depicts an exemplary embodiment of a viewer platform for users to consume content generated according to embodiments of the present disclosure. In this example, one or more users have created one or more screenplay data streams that can be viewed by other users through the viewer platform. To access a story, a user highlights the story and clicks a link (not shown) that says, "Read Story".

Figure 5B:
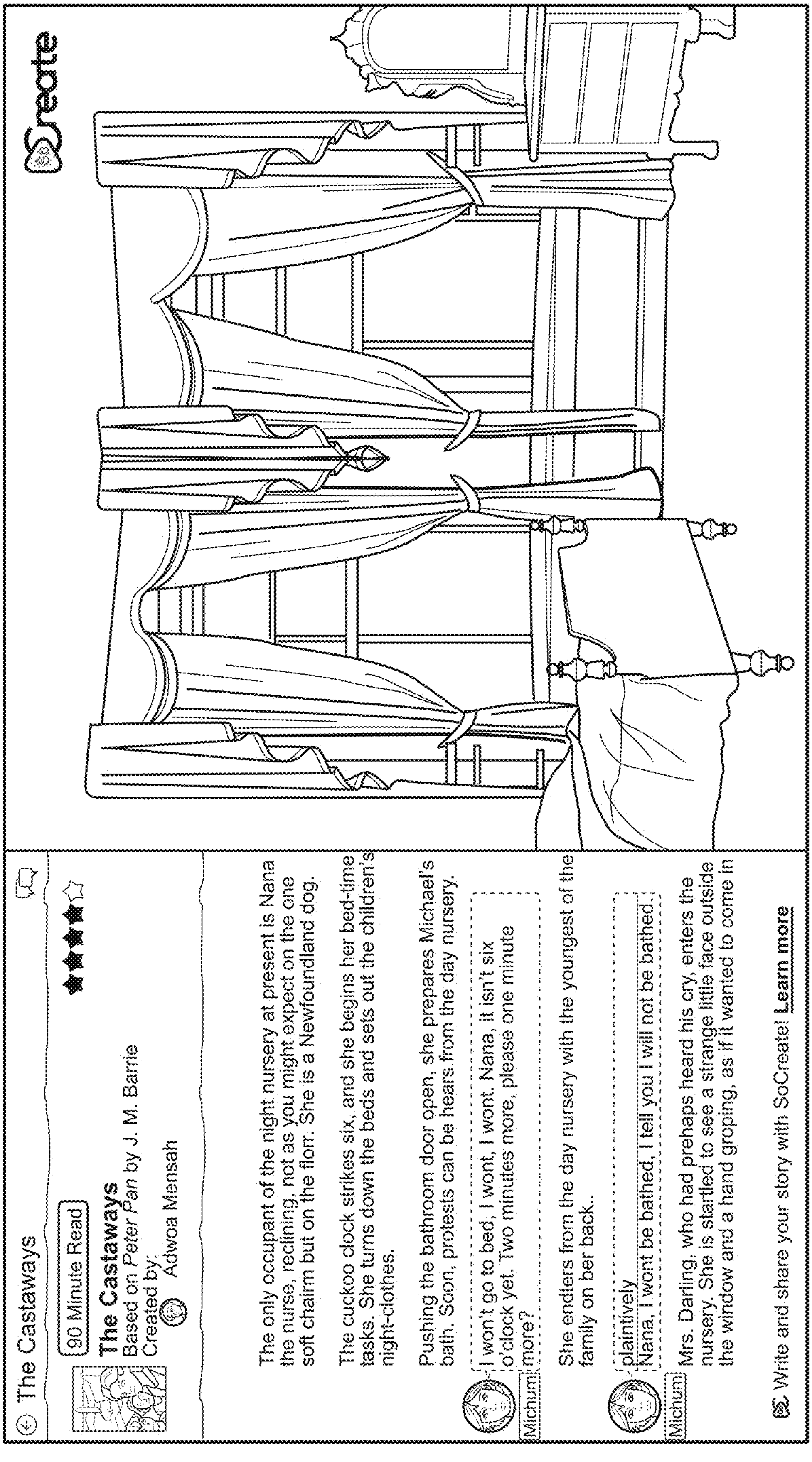

FIG. 5B depicts a screenshot following the user's click of "Read Story". A script is depicted showing action and dialogue components with associated characters' names and faces. In some embodiments, the faces depict emotional cues. In the present embodiment, also depicted is an image of the location and time of the scene, here a child's bedroom on a clear night. This and other images associated with the screenplay can be uploaded or selected by the creator, or in some embodiments, generated by artificial intelligence methods as outlined herein.

Figure 6A:
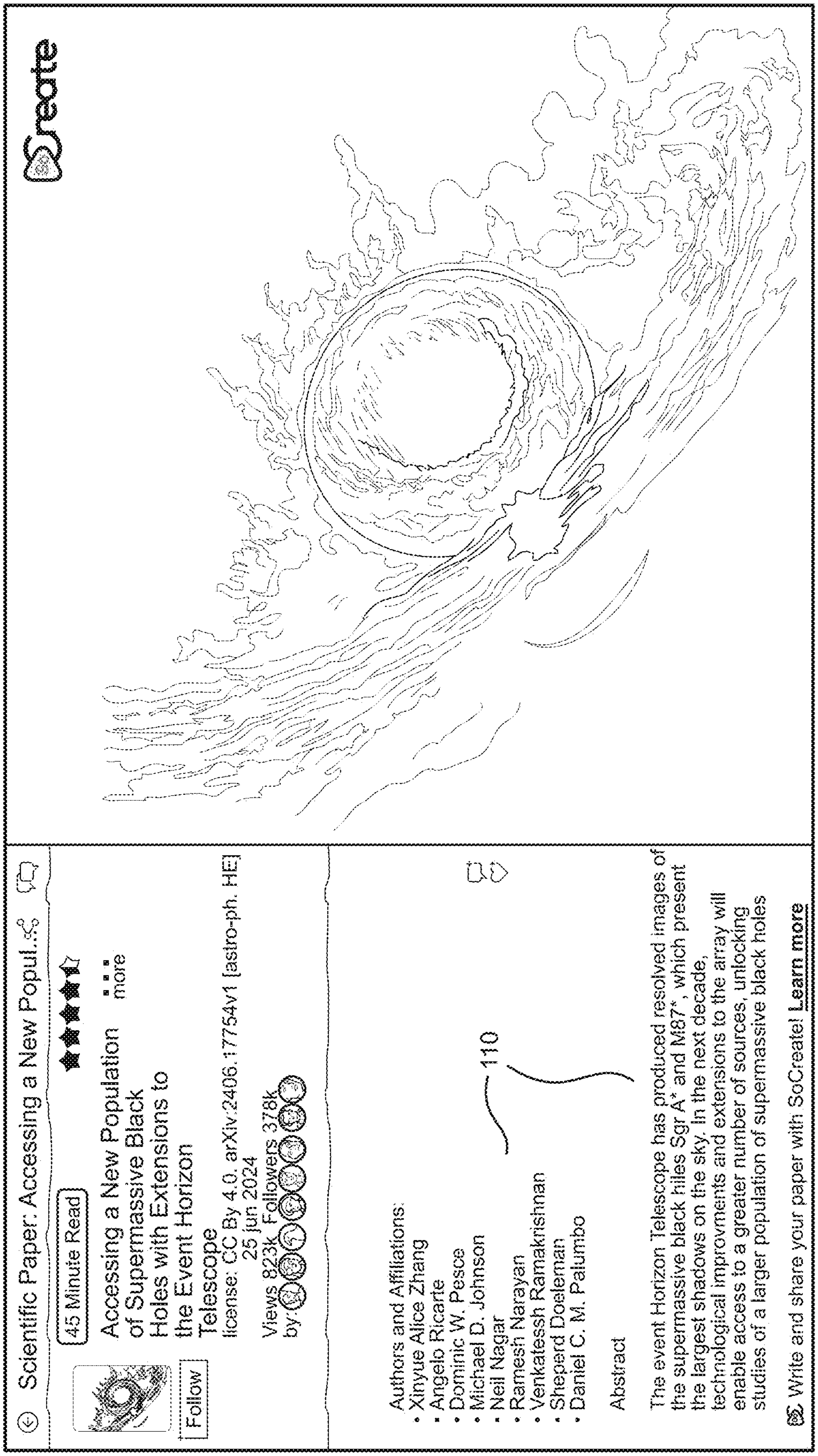
FIGS. 6A-6C depict an exemplary embodiment of a data stream for a scientific paper using the exemplary systems and methods described herein.

FIG. 6A depicts an exemplary embodiment of a further exemplary use of the present disclosure. In FIG. 6A, a scientific paper has been generated. The scientific paper is viewable on a viewer platform like that of FIG. 5A. Multiple contextual data containers 110 are depicted, including "Authors and Affiliations" and "Abstract". Associated content from object containers includes author profiles and related works, such as references. In some embodiments, hyperlinks are included in the contextual data containers 110 or the object containers 115*n*. Data retrievable from the hyperlinks is incorporated into the LLM prompts that are used to generate images for the publication.

A user may define a global module 105*a* for references and associate the references to one or more modules 105*b* in the data stream. The user may then enter object data associated with one or more references into a local module 105*b* and denote the association with a tag or link to the reference.

Figure 6B:
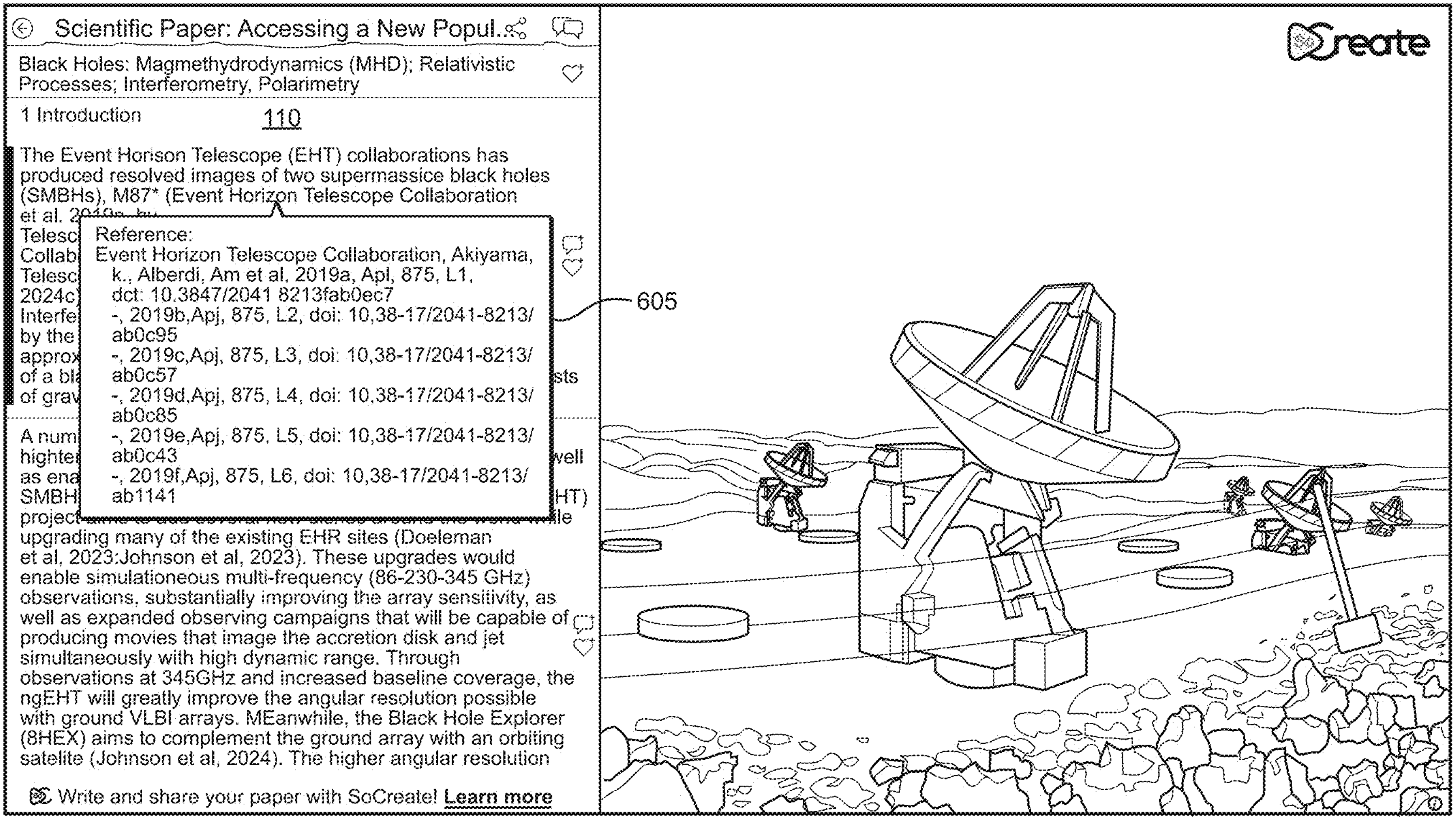

FIG. 6B depicts the exemplary embodiment of FIG. 6A in a subsequent module of the data stream. A local module labeled "Introduction" includes a body of content and associated context, here hyperlinks and references. The contextual data container 110 includes the body of the introduction as well as links to references in a reference tag 605, which have been defined in object containers 115*n* (not shown in FIG. 6B). Here the system is configured to display links to the references to determine the source of a citation and, in some embodiments, includes a hyperlink to external data, such as data retrievable from the world wide web.

Figure 6C:
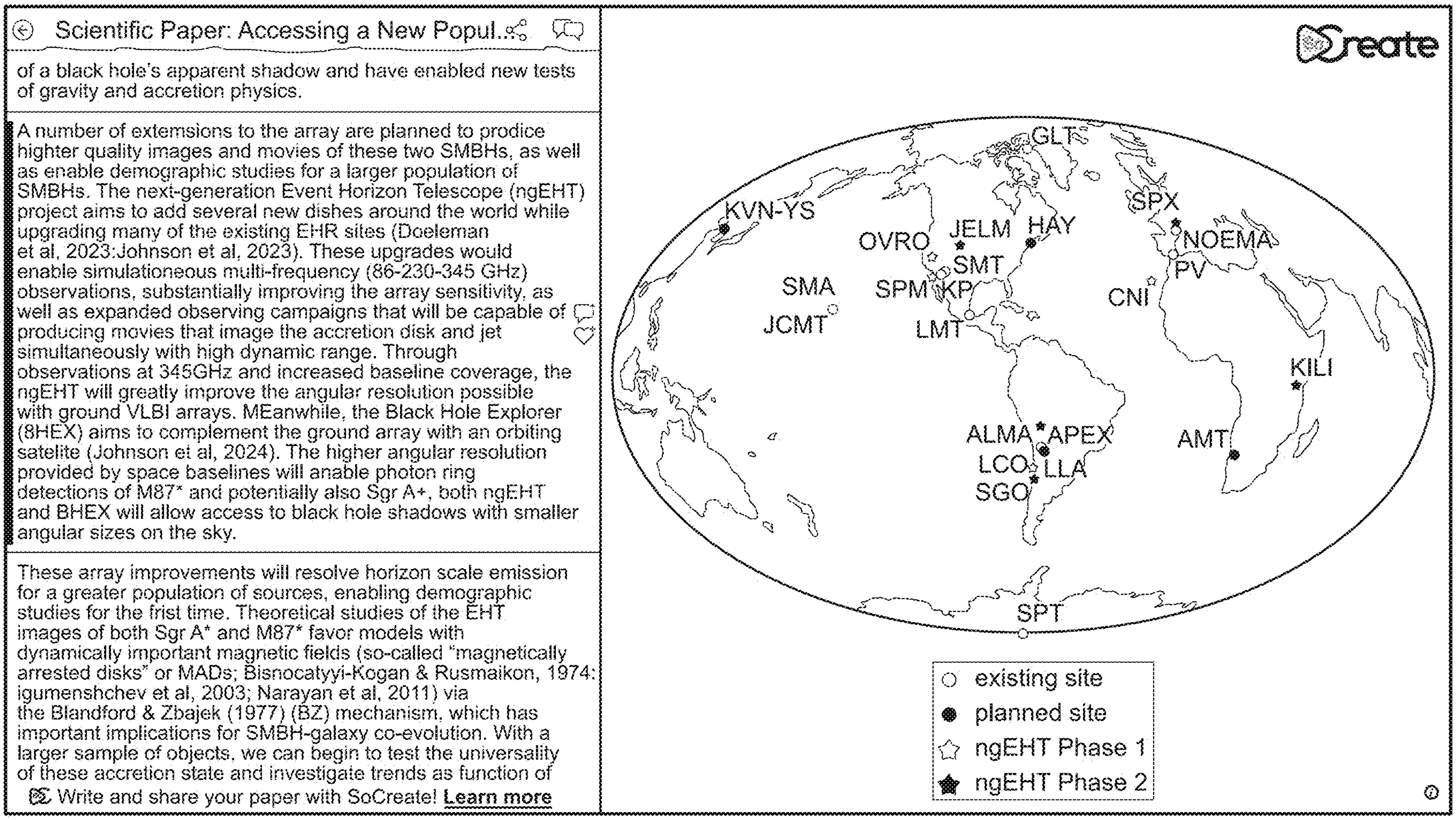

FIG. 6C depicts the exemplary scientific paper in a subsequent part of the data stream. Here, associated object data includes image and geolocation data for events referenced throughout the project. As with screenplay embodiments, a global module 105*a* can be defined, such as for locations. The data from the global module 105*a* is referenced in a contextual data container in a local module 105*b* to denote locations, such as the existing and planned locations of satellite dishes.

As shown, associated context can include visual elements retrievable from sources outside of the linear data stream, such as hyperlinks and other pre-stored data from data sources that are external to the data storage and retrieval system on which the linear data stream is stored.

Figure 7A:
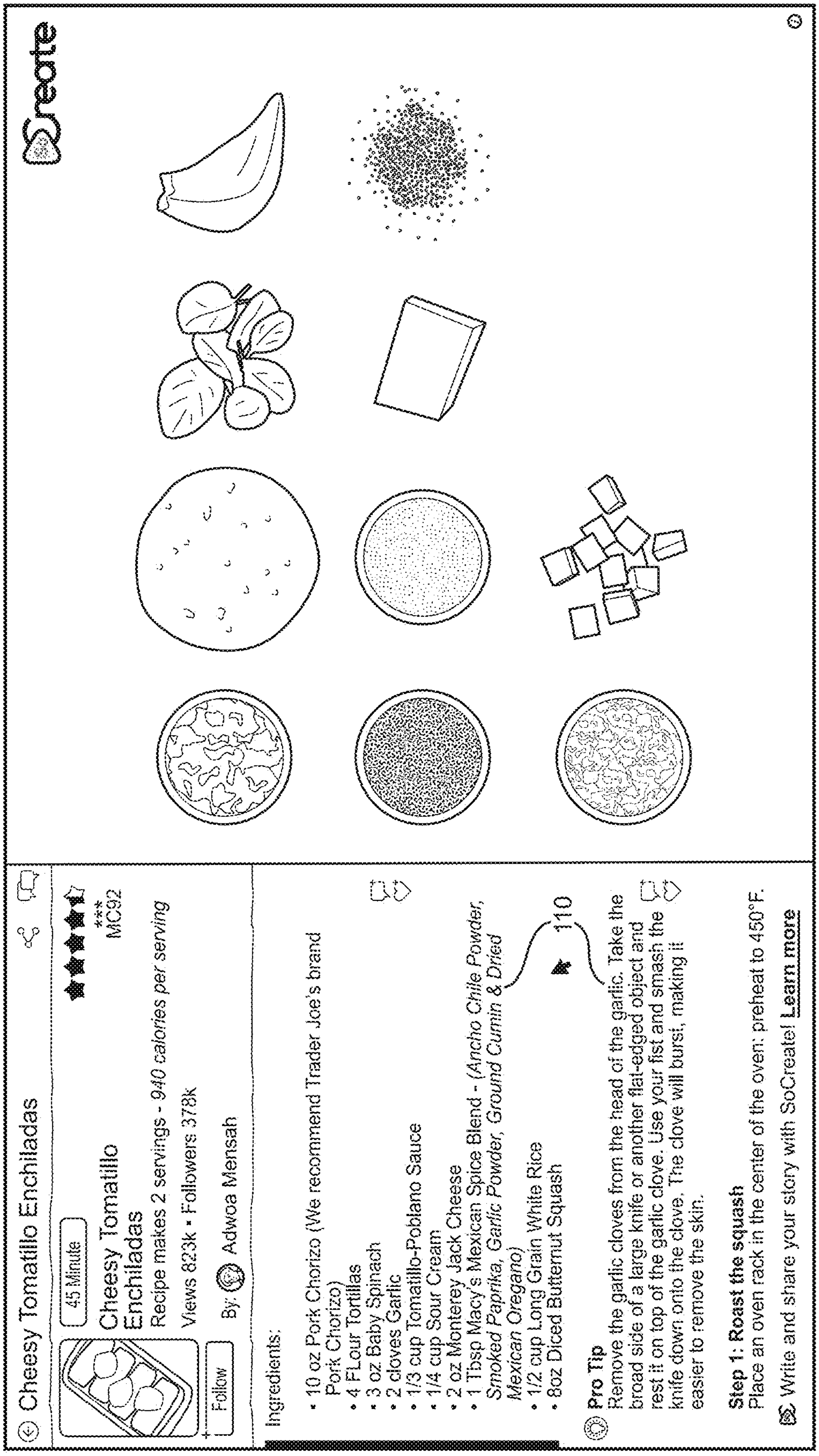
FIGS. 7A-7B depict an exemplary embodiment of a data stream for a recipe using the exemplary systems and methods described herein.

FIG. 7A depicts a further exemplary embodiment of the present disclosure. In this exemplary embodiment, the system is used to compile a data stream in the form of a recipe for a meal ("Cheesy Tomatillo Enchiladas"). A plurality of local modules 105*b* is created for the recipe, including "Ingredients," "Pro Tips", and "Step 1". Each local module

105*b* includes contextual data, which in turn has associated context from object containers 115*n* (not shown).

In this example, the user has created a local module 105*b* for "Ingredients". A global module 105*a* for ingredients, not shown, can also be created to associate the ingredient object data with steps, pro tips, and other local modules throughout the recipe project. The object data for ingredients may include where to buy or how to handle, such as how to mince garlic or how to brown butter. In some embodiments, links or uploads for video tutorials are included as object data.

Although the ingredients are listed in a global module 105*a*, creating a local module 105*b* listing each of the ingredients in a contextual data container 110 ensures that the list will be included as part of the published data stream, including any images associated with the published data stream. This image association is demonstrated by the ingredients visually depicted in FIG. 7A.

Under "Ingredients" in the global module 105*a*, each listed ingredient includes a link. In some embodiments, the link displays an overview of the ingredient from data in an object container 115*n*, and in some embodiments the link displays a "where to buy" option, which may include a hyperlink for purchase at a local or online grocery store.

Figure 7B:
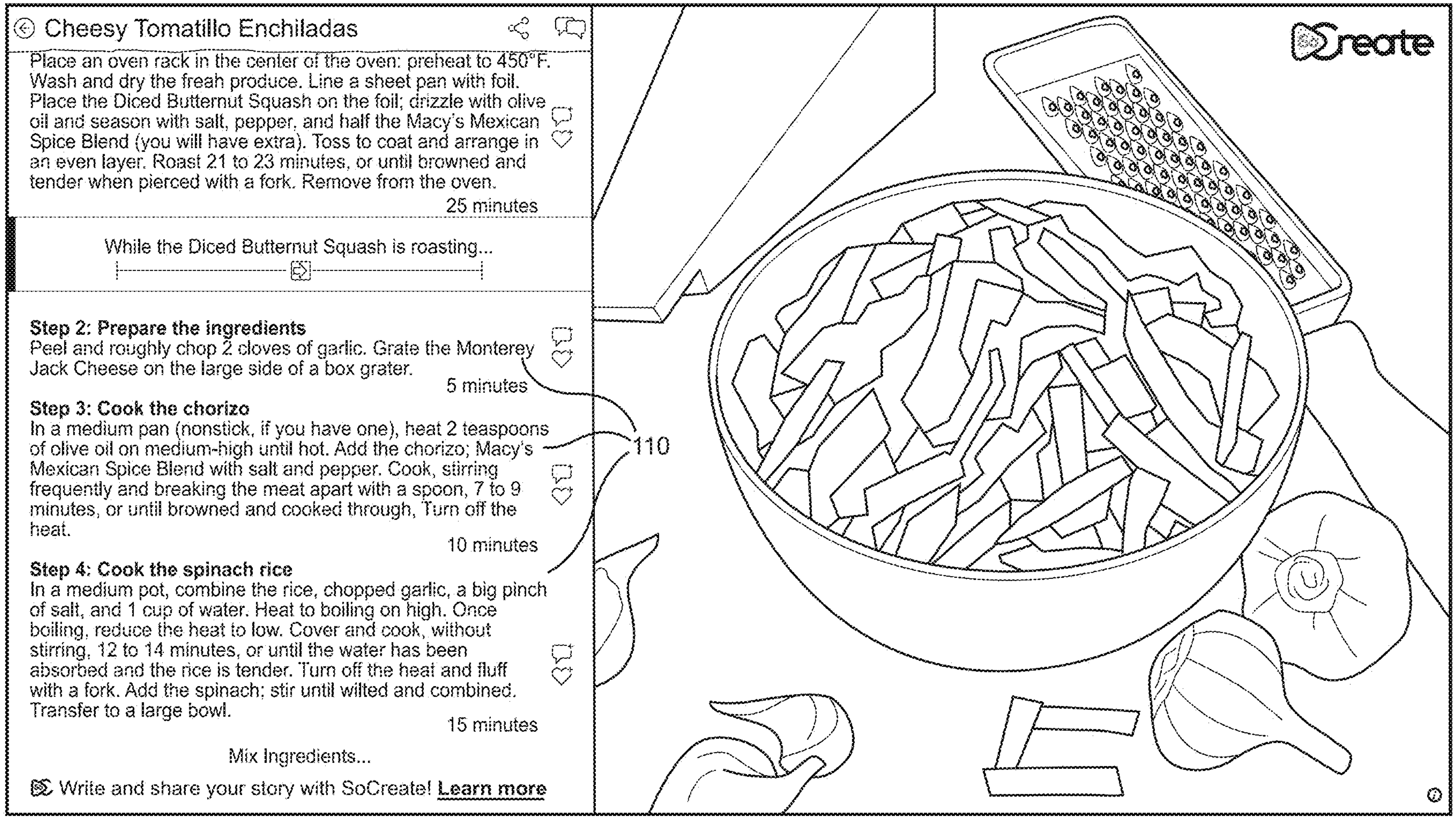

FIG. 7B depicts the exemplary embodiment of FIG. 7A in a subsequent part of the data stream. Local modules 105*b* have been created for each of the steps in the recipe, each having contextual data containers 110 describing the steps. Here, associated context under the various steps in the recipe includes "How To" for an action, for example, how to mince garlic or brown butter. In some embodiments, associated context includes a video tutorial for such actions as outlined in the recipe data stream.

In some embodiments, data stream content and associated context are used to generate prompts for machine learning and artificial intelligence outputs. For example, a creator may generate a recipe for enchiladas, as depicted in FIGS. 7A and 7B. The system takes the creator's input, which includes the title, Ingredients module, Steps modules, and all context associated therewith, and generates further associated content, such as images of individual ingredients or of the finished product. In some embodiments, the system uses a prompt to generate a "How To" video stream from the creator input and associated context.

Figure 8A:
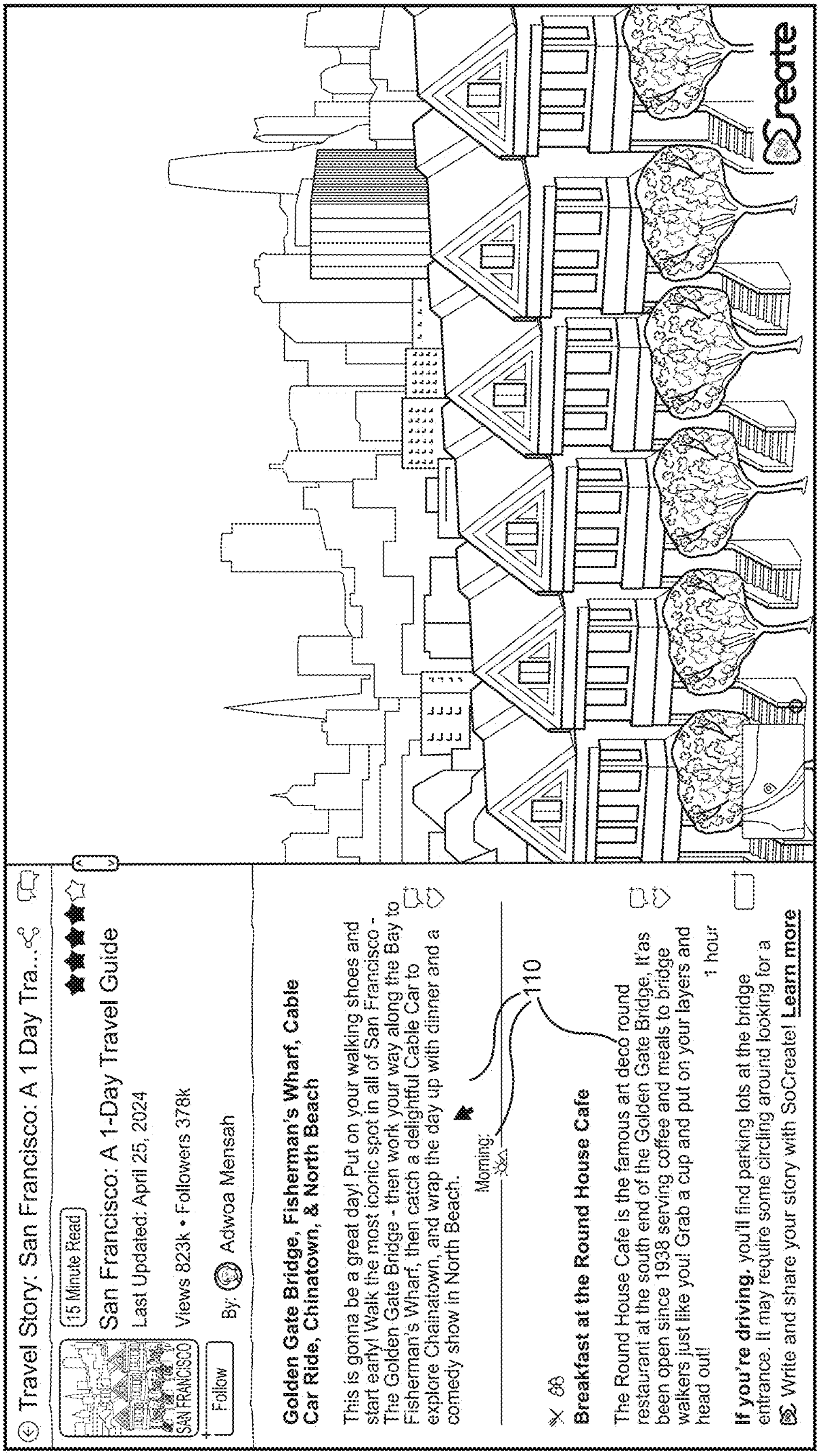
FIGS. 8A-8B depict an exemplary embodiment of a data stream for a travel guide using the exemplary systems and methods described herein.
Figure 8B:
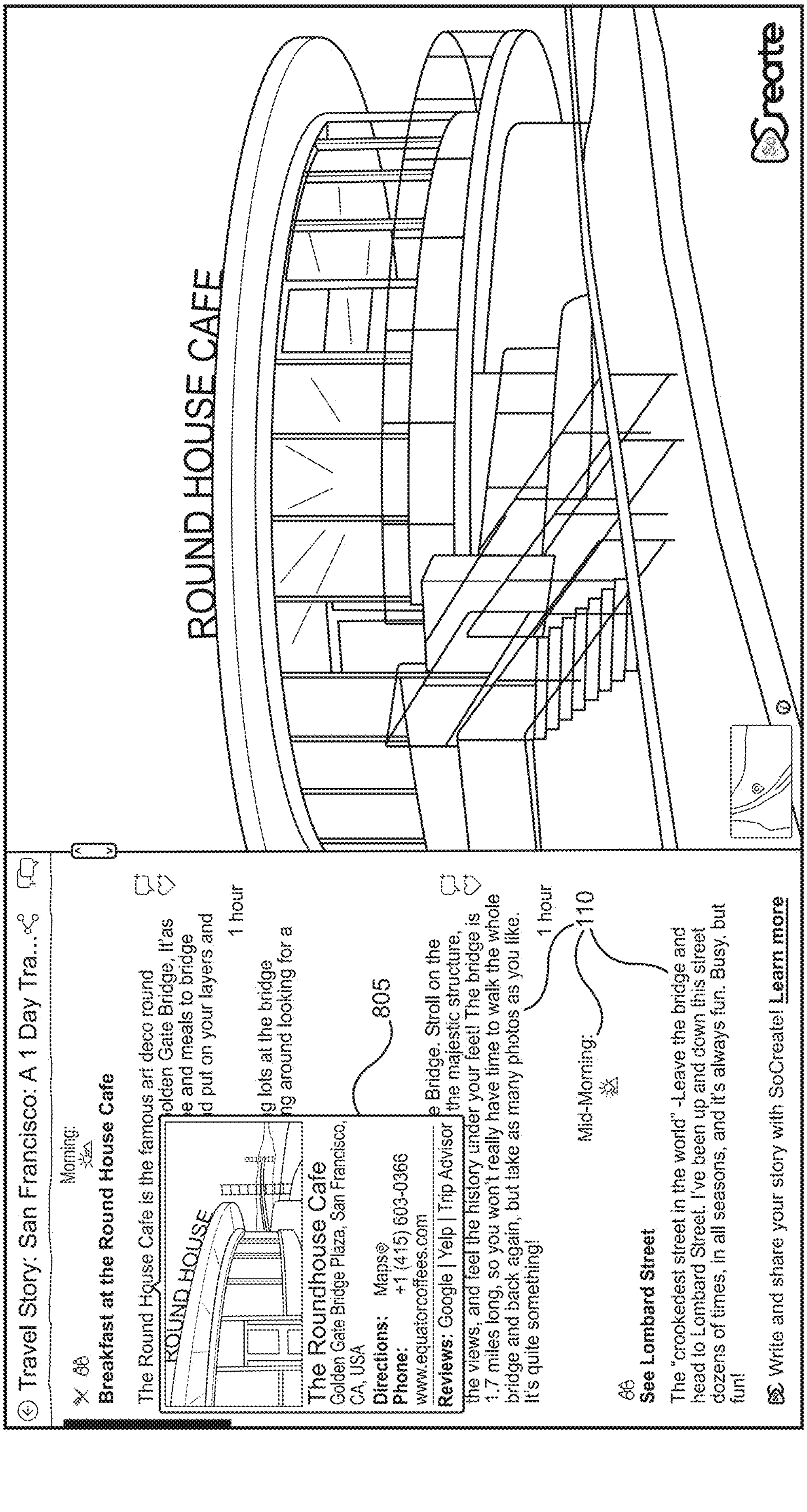

FIGS. 8A-8B depict an exemplary embodiment of a data stream for a travel guide using the exemplary systems and methods described herein. In the example of FIGS. 8A-8B, a project is created for "San Francisco: A 1-Day Travel Guide". A plurality of local modules 105*b* indicate an introduction and a first activity. The creator has used a contextual data container 110 to indicate the time of day ("Morning" on FIG. 8A through "Mid-Morning" on FIG. 8B) for each activity described in the data stream.

Object containers 115*n* may include data locations within a travel destination, such as sightseeing activities, dining, and lodging. The user interface may include hyperlinks to websites for the locations, review pages, user-created data containers, or a map having annotations, or pins, for the locations identified in the object containers 115*n*.

FIG. 8B shows an exemplary use of the data stream to highlight associated object data. A link to an object data profile 805 is shown for the location "Roundhouse Café". By hovering over the link, a user views information stored in one or more object containers 115*n*, which includes a map location, phone number, and reviews on various external websites.

In various embodiments, data from each of the modules is submitted to at least one large language model to generate a first set of prompts for subsequent image generation. The first set of prompts is then submitted to an image-generating large language model, which produces a set of images for each module. The images are collated, associated with the contextual data containers 110, and published as a linear data stream.

Figure 9A:
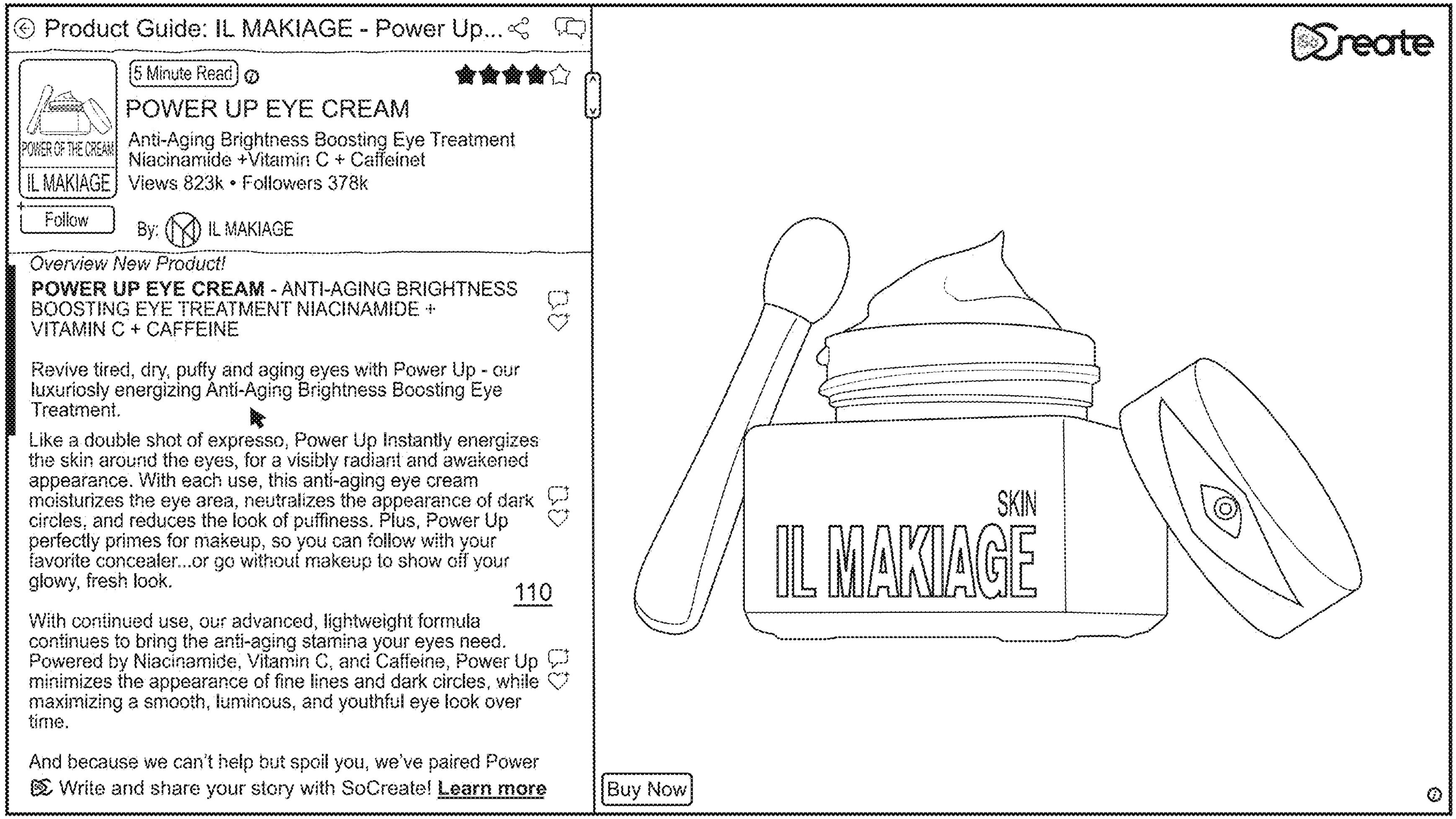
FIGS. 9A-9B depict an exemplary embodiment of a data stream for a product demonstration using the exemplary systems and methods described herein.
Figure 9B:
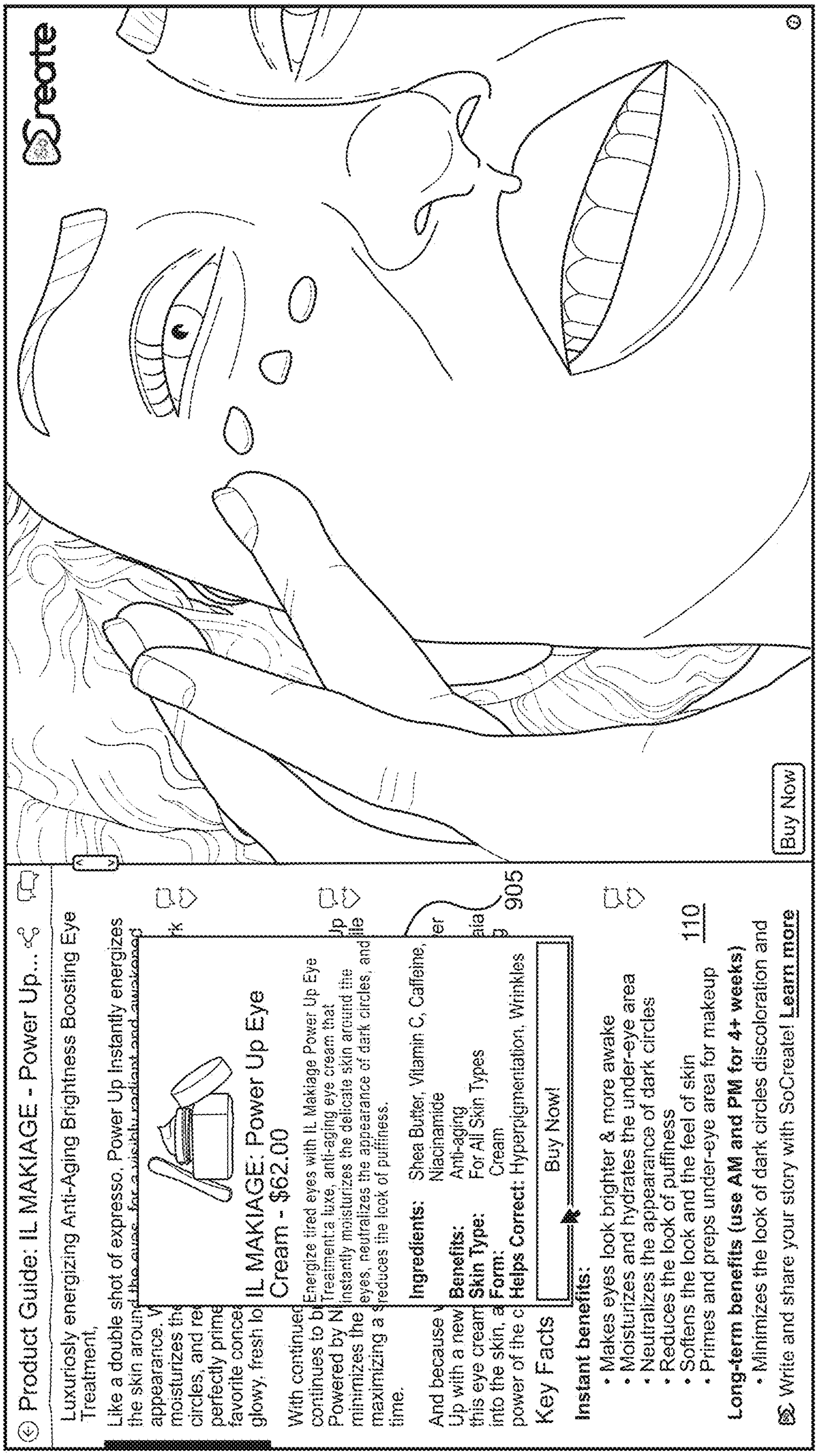

FIGS. 9A-9B depict an exemplary embodiment of a data stream for a product demonstration using the exemplary systems and methods described herein. In the example of FIGS. 9A-9B, a project is created for "Power Up Eye Cream". A plurality of local modules 105*b* indicate an overview (FIG. 9A) and a list of key facts (FIG. 9B). Further modules having contextual data containers 110 may be created for ingredients, parts, certifications, testimonials, and other relevant product information.

In the example of FIGS. 9A-9B, a product object container 905 includes a brief summary of the product, ingredients, benefits, and further quick facts, as well as a "Buy Now 49" link to a resource for purchasing the product, which may redirect the user to an e-commerce platform.

In various embodiments, data from each of the modules is submitted to at least one large language model to generate a first set of prompts for subsequent image generation. The first set of prompts are then submitted to an image-generating large language model, which produces a set of images for each module. The images are collated, associated with the contextual data containers 110, and published as a linear data stream.

In some embodiments, the system is trained on vast amounts of data, such as the entire Internet, while in some embodiments, the system is trained on tailored subsets of data, such as other recipes, food blogs, and context associated with other recipes.

The vast amounts of data collected from content in a data stream and associated context are used in prompt engineering to generate prompts. As used herein, prompts are generally natural language instructions for a generative artificial intelligence (generative AI) model to perform a task that produces an output. The prompts are then used in machine learning embodiments such as generative AI models to generate outputs such as images, videos, or full and formatted scripts. For example, in an exemplary screenplay embodiment, a creator may specify a wardrobe for each character and further specify the attire for the character in each scene. The wardrobe and attire comprise associated context for the content within the module for the scene. Alternatively, the character's wardrobe serves as a set of contextual data associated with the character and does not need to be specified for individual scenes. In either such case, the system uses the content and associated context to generate a prompt for the generative AI model, which then returns an image, video for playback, or other specified output depicting the character in the wardrobe associated with the character in general, or specifically with the character in a particular scene. The prompt may be simple or extensive, and may include delineations for style, length, structure, and items to ignore or omit, non-exhaustively.

Some embodiments also use the data stream content and associated context to generate prompts for generative artificial intelligence models. For example, when a creator indicates that a scene takes place in Las Vegas, the system prepares a prompt indicating a request to return an image, video, or other output with location and time of day, and generates an image of Las Vegas, such as a hotel or skyline. If the user indicates that the scene takes place at sunset, the system generates a similar image of the Las Vegas hotel or skyline at sunset. In some embodiments, video content is generated from modules within the screenplay data stream, including portrayals of actions, expressions, dialogue, and props outlined within the module. In some embodiments, content generated from individual modules is stitched together for a final presentation as a single video stream.

Similarly, in embodiments for recipes, in some embodiments, a creator specifies the set of kitchen appliances, tools, or utensils to use in a recipe. A creator might, for example, indicate that ingredients should be placed in a bowl and mixed using an upright mixer. The appliances, tools, and utensils comprise context for one or more steps in the recipe and can be used in the generation of prompts for generative AI. The generative AI then generates a video depicting the placing of ingredients in a bowl and mixing with the upright mixer.

It should further be noted that system outputs are not limited to images, videos for playback, or written content. Exemplary embodiments use the data stream content and associated context to produce outputs including audio, such as sound effects, songs, and other music. Exemplary embodiments further produce 2D and/or 3D maps, diagrams, tables, and other representative content. Again, this list is not exhaustive.

It should further be noted that the systems and methods described herein include methods of structuring data, and systems for using the data as structured, enable more efficient use of the data, including for users generating a document for publication; for systems compiling and collating information in the data stream; and for machine-learning embodiments using prompts and data stream modules to produce an output.

Figure 10:
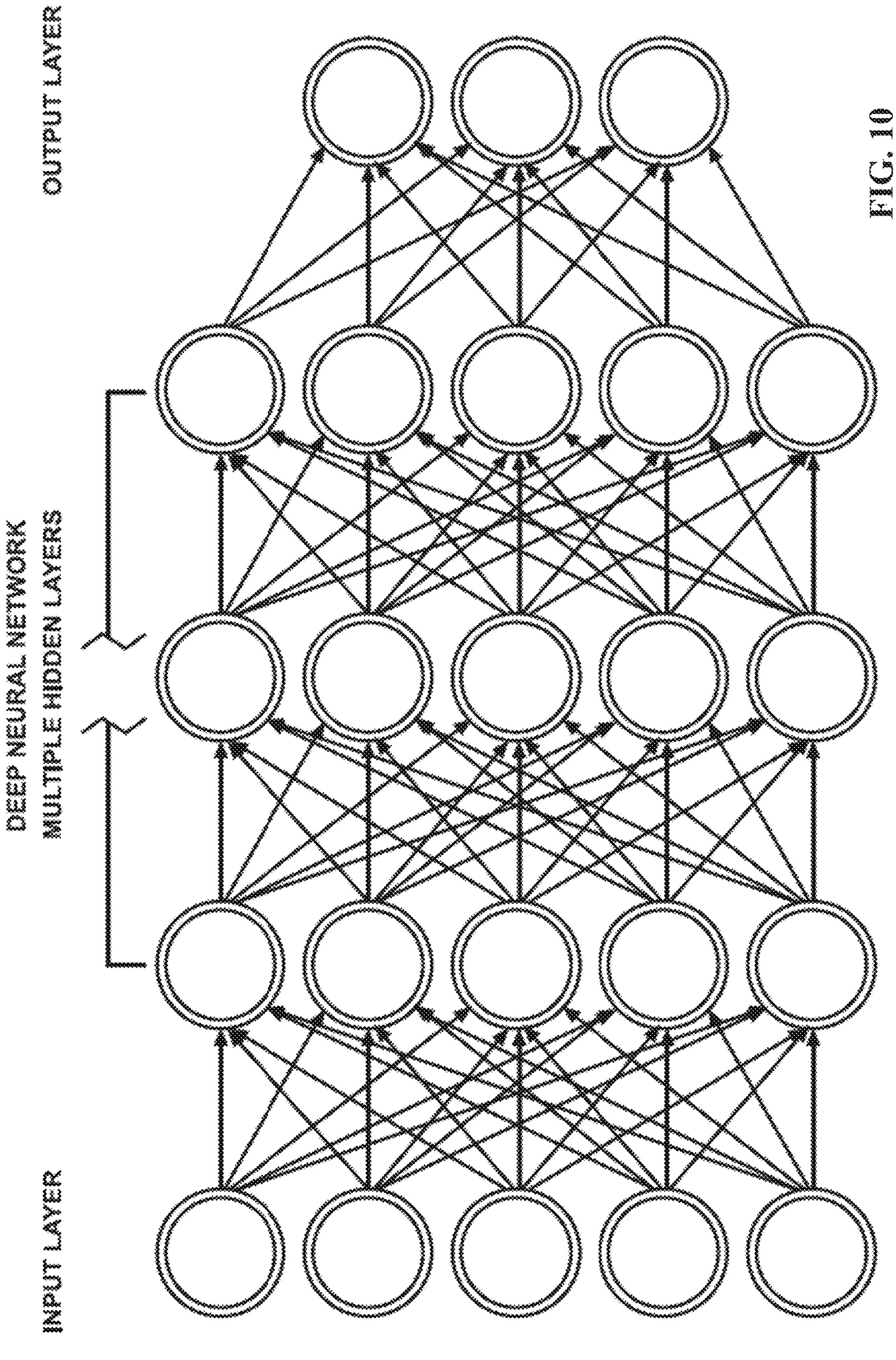
FIG. 10 depicts an exemplary deep neural network.

FIG. 10 shows an exemplary deep neural network.

Neural networks, also known as artificial neural networks (ANNs) or simulated neural networks (SNNs), are a subset of machine learning and are at the heart of deep learning algorithms. Their name and structure are inspired by the human brain, mimicking the way that biological neurons signal to one another. Artificial neural networks (ANNs) are comprised of node layers, comprising an input layer, one or more hidden layers, and an output layer. Each node, or artificial neuron, connects to another and has an associated weight and threshold. If the output of any individual node is above the specified threshold value, that node is activated, sending data to the next layer of the network. Otherwise, no data is passed along to the next layer of the network.

Neural networks rely on training data to learn and improve their accuracy over time. However, once these learning algorithms are fine-tuned for accuracy, they are powerful tools in computer science and artificial intelligence, allowing one to classify and cluster data at a high velocity. Tasks in speech recognition or image recognition can take minutes versus hours when compared to the manual identification by human experts.

In some exemplary embodiments, one should view each individual node as its own linear regression model, composed of input data, weights, a bias (or threshold), and an output. Once an input layer is determined, weights are assigned. These weights help determine the importance of any given variable, with larger ones contributing more significantly to the output compared to other inputs. All inputs are then multiplied by their respective weights and then summed. Afterward, the output is passed through an activation function, which determines the output. If that output exceeds a given threshold, it "fires", or activates the node, passing data to the next layer in the network. This results in the output of one node becoming the input of the next node. This process of passing data from one layer to the next layer defines this neural network as a feedforward network. Larger weights signify that particular variables are of greater importance to the decision or outcome.

According to some exemplary embodiments, deep neural networks are feedforward, meaning they flow in one direction only, from input to output. However, one can also train a model through backpropagation; that is, move in the opposite direction from output to input. Backpropagation allows one to calculate and attribute the error associated with each neuron, allowing one to adjust and fit the parameters of the model(s) appropriately.

In machine learning, backpropagation is an algorithm for training feedforward neural networks. Generalizations of backpropagation exist for other artificial neural networks (ANNs), and for functions generally. These classes of algorithms are all referred to generically as "backpropagation". In fitting a neural network, backpropagation computes the gradient of the loss function with respect to the weights of the network for a single input-output example, and does so efficiently, unlike a naive direct computation of the gradient with respect to each weight individually. This efficiency makes it feasible to use gradient methods for training multilayer networks, updating weights to minimize loss; gradient descent, or variants such as stochastic gradient descent, are used. The backpropagation algorithm works by computing the gradient of the loss function with respect to each weight by the chain rule, computing the gradient one layer at a time, iterating backward from the last layer to avoid redundant calculations of intermediate terms in the chain rule; this is an example of dynamic programming. The term backpropagation strictly refers only to the algorithm for computing the gradient, not how the gradient is used; however, the term is often used loosely to refer to the entire learning algorithm, including how the gradient is used, such as by stochastic gradient descent. Backpropagation generalizes the gradient computation in the delta rule, which is the single-layer version of backpropagation, and is in turn generalized by automatic differentiation, where backpropagation is a special case of reverse accumulation (or "reverse mode").

With respect to FIG. 10, according to some exemplary embodiments, the system produces an output, which in turn produces an outcome, which in turn produces an input. In some embodiments, the output may become the input.

Deep Neural Networks, such as the one exemplified in FIG. 10, can be used to support artificial intelligence methods and systems, such as Large Language Models, for the embodiments described herein.

While various embodiments have been described above, it should be understood that the embodiments have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the technology as defined by the appended claims. Thus, the breadth and scope of a preferred embodiment should not be limited by any of the above-described exemplary embodiments.

What is claimed is:

1. A system for compilation of a linear data stream using granular version control and context associations, the system comprising:

a processor and a memory coupled to the processor, the processor and the memory coupled to one or more large language models, the memory having instructions which, when executed, perform the steps of a method, the method comprising:

a) receiving one or more user-defined global modules and one or more global module data containers within the global modules, the global module data containers storing natural language textual descriptions defining attributes of objects;

b) receiving one or more user-defined local modules and one or more local module data containers within the local modules, the local module data containers storing at least one of natural language textual descriptions defining contextual content or natural language textual descriptions defining attributes of objects;

c) associating object data from the user-defined global modules with the user-defined local modules; and d) publishing the data stream, the publishing comprising:

i) submitting the associated object data to the large language models, the large language models generating a plurality of prompts for subsequent image generation;

ii) submitting the plurality of prompts to the large language models to generate a plurality of images;

iii) associating the plurality of images with the object data contained in the local module data containers;

iv) collating the plurality of images in sequential order according to an order defined by the global modules and the local modules to form the linear data stream; and v) outputting the linear data stream in re-playable format as a complete content work.

2. The system of claim 1, further comprising at least one of the local modules functioning as a structural element for the linear data stream.

3. The system of claim 1, further comprising at least one of the local module data containers functioning as a contextual data container providing contextual data for the linear data stream.

4. The system of claim 1, further comprising at least one of the global module data containers or at least one of the local module data containers comprises an object container.

5. The system of claim 1, the linear data stream comprising any of: a screenplay, an academic paper, a recipe, a travel guide, and a product demonstration.

6. The system of claim 1, the publishing further comprising: submitting the plurality of prompts to the large language models to generate a plurality of audio files and associating the plurality of audio files with the object data contained in the local module data containers.

7. The system of claim 1, the method further comprising training an object model on the object data and data from at least one source database, the object model representing an object associated with the linear data stream.

8. The system of claim 7, the object model representing any one of: a character in a screenplay; a reference in an academic paper; an ingredient in a recipe; an overview of a product; and a location associated with the linear data stream.

9. A method for compilation of a linear data stream using granular version control and context associations, the method executable by a processor and a memory coupled to the processor, the method comprising:

a) receiving one or more user-defined global modules and one or more global module data containers within the global modules, the global module data containers storing natural language textual descriptions defining attributes of objects;

b) receiving one or more user-defined local modules and one or more local module data containers within the local modules, the local module data containers storing at least one of natural language textual descriptions defining contextual content or natural language textual descriptions defining attributes of objects;

c) associating object data from the user-defined global modules with the user-defined local modules; and d) publishing the data stream, the publishing comprising:

i) submitting the associated object data to one or more large language models, the large language models generating a plurality of prompts for subsequent image generation;

ii) submitting the plurality of prompts to the large language models to generate a plurality of images;

iii) associating the plurality of images with the object data contained in the local module data containers;

iv) collating the plurality of images in sequential order according to an order defined by the global modules and the local modules to form the linear data stream; and v) outputting the linear data stream in re-playable format as a complete content work.

10. The method of claim 9, further comprising at least one of the local modules functioning as a structural element for the linear data stream.

11. The method of claim 9, further comprising at least one of the local module data containers functioning as a contextual data container providing contextual data for the linear data stream.

12. The method of claim 9, further comprising at least one of the global module data containers or at least one of the local module data containers comprises an object container.

13. The method of claim 9, the linear data stream comprising any of: a screenplay, an academic paper, a recipe, a travel guide, and a product demonstration.

14. The method of claim 9, the publishing further comprising: submitting the plurality of prompts to the large language models to generate a plurality of audio files and associating the plurality of audio files with object data contained in the local module data containers.

15. The method of claim 9, the method further comprising training an object model on the object data and data from at least one source database, the object model representing an object associated with the linear data stream.

16. The method of claim 15, the object model representing any one of: a character in a screenplay; a reference in an academic paper; an ingredient in a recipe; an overview of a product; and a location associated with the linear data stream.

17. A method for compilation of a linear data stream using granular version control and context associations, the method executable by a processor and a memory coupled to the processor, the method comprising:

a) defining one or more global modules and one or more global module data containers within the global modules, the global module data containers storing natural language textual descriptions defining attributes of objects;

b) defining one or more local modules and one or more local module data containers within the local modules, the local module data containers storing at least one of natural language textual descriptions defining contextual content or natural language textual descriptions defining attributes of objects;

c) associating object data from the global modules with the local modules; and d) submitting the associated object data for publishing as a data stream, the publishing comprising:

i) submitting the associated object data to one or more large language models, the large language models generating a plurality of prompts for subsequent image generation;

ii) submitting the plurality of prompts to the large language models to generate a plurality of images;

iii) associating the plurality of images with the object data contained in the local module data containers;

iv collating the plurality of images in sequential order according to an order defined by the global modules and the local modules to form the linear data stream; and v) outputting the linear data stream in re-playable format as a complete content work.

18. The method of claim 17, further comprising at least one of the local modules functioning as a structural element for the linear data stream.

19. The method of claim 17, further comprising at least one of the local module data containers functioning as a contextual data container providing contextual data for the linear data stream.

20. The method of claim 17, the linear data stream comprising any of: a screenplay, an academic paper, a recipe, a travel guide, and a product demonstration.

* * * * *